United States Patent [19]

Iwasaki et al.

[11] Patent Number: 5,469,274
[45] Date of Patent: Nov. 21, 1995

[54] IMAGE PROCESSING APPARATUS FOR COMBINING DIFFERENTLY CORRECTED IMAGES

[75] Inventors: Keisuke Iwasaki, Yamato; Kengo Takahama, Nara, both of Japan

[73] Assignee: Sharp Kabushiki Kaisha, Japan

[21] Appl. No.: 26,454

[22] Filed: Mar. 3, 1993

[30] Foreign Application Priority Data

Mar. 12, 1992 [JP] Japan ..................... 4-053417

[51] Int. Cl.$^6$ .................. H04N 1/387; G06K 9/32; G06T 3/00
[52] U.S. Cl. .................. 358/450; 382/294; 395/136
[58] Field of Search .................. 358/448, 450–453, 358/471, 474, 525; 348/214, 219, 220, 222, 295, 317, 37–39; 382/44–47, 294, 309, 304; 395/135–138; H04N 1/387, 1/40

[56] References Cited

U.S. PATENT DOCUMENTS

| | | | |
|---|---|---|---|
| 4,731,743 | 3/1988 | Blancato | 395/135 |
| 4,790,025 | 12/1988 | Inoue et al. | 382/44 |
| 4,839,826 | 6/1989 | Urushibata | 382/44 |
| 5,159,444 | 10/1992 | Shimizu | 358/527 |
| 5,262,852 | 11/1993 | Eouzan et al. | 348/39 |
| 5,265,214 | 11/1993 | Nitta | 395/135 |

OTHER PUBLICATIONS

Tsuji: "Panoramic Representation of Environment," J. Of Institute of Electronics Information and Communication Engineers of Japan, pp. 354–359, 1991.

Uehira: "High–Speed Still Image Reading Using Multi–Area Sensors, " Briefs 1991 Spring Nat. Conf., IECEJ, pp. 7–103, published 1991, Tokyo, Japan.

Uehira: "High Speed Still Image Reader Using Optically Coupled Multi Area Sensors," J. of Inst. Img.Electro., pp. 203–208, published 1991, Tokyo, Japan.

Okada et al: "A hand–Scan Image Digitizer With an Ability for Realtime Assembling of Mosaic Pictures," IE 81–17, published 1981, Tokyo, Japan.

Yoshizawa et al: "A Background Extraction Method from Panning Scene," Briefs 1990 Spring Nat. Conf., IECEJ, pp. 7–51, published 1990, Tokyo, Japan.

Nakamura et al: "A method of connecting separately picked images into a wide panorama image," Briefs 1991 Spring Nat. Conf., IECEJ, pp. 7–165, 1991, Tokyo.

Yoshida et al: "Study on Resolution Improvement With Swing CCD Operation, " IE 83–65, published 1983, Tokyo, Japan.

Primary Examiner—Scott A. Rogers
Assistant Examiner—Kim Yen Vu
Attorney, Agent, or Firm—Nixon & Vanderhye

[57] ABSTRACT

An image processing apparatus comprises an image storing device and an image inputting device, in which a parameter determining circuit compares an image input through the image inputting device with an image stored in the image storing device to calculate parameters for correction and in which the input image is corrected by a correction method different from that effected on the image having been stored, then to be combined therewith. The processing is sequentially effected on time-serially input images to produce a higher resolution image in the image storing device as compared with the input images.

7 Claims, 24 Drawing Sheets

"." REPRESENTS
A REPRESENTATIVE POINT.

"·" REPRESENTS A CANDIDATE OF REPRESENTATIVE POINT.

"·" REPRESENTS A REPRESENTATIVE POINT.

"·" REPRESENTS A REPRESENTATIVE POINT; M, N NUMBERS OF PIXELS; (x, y) A COORDINATE ON MAIN IMAGE MEMORY.

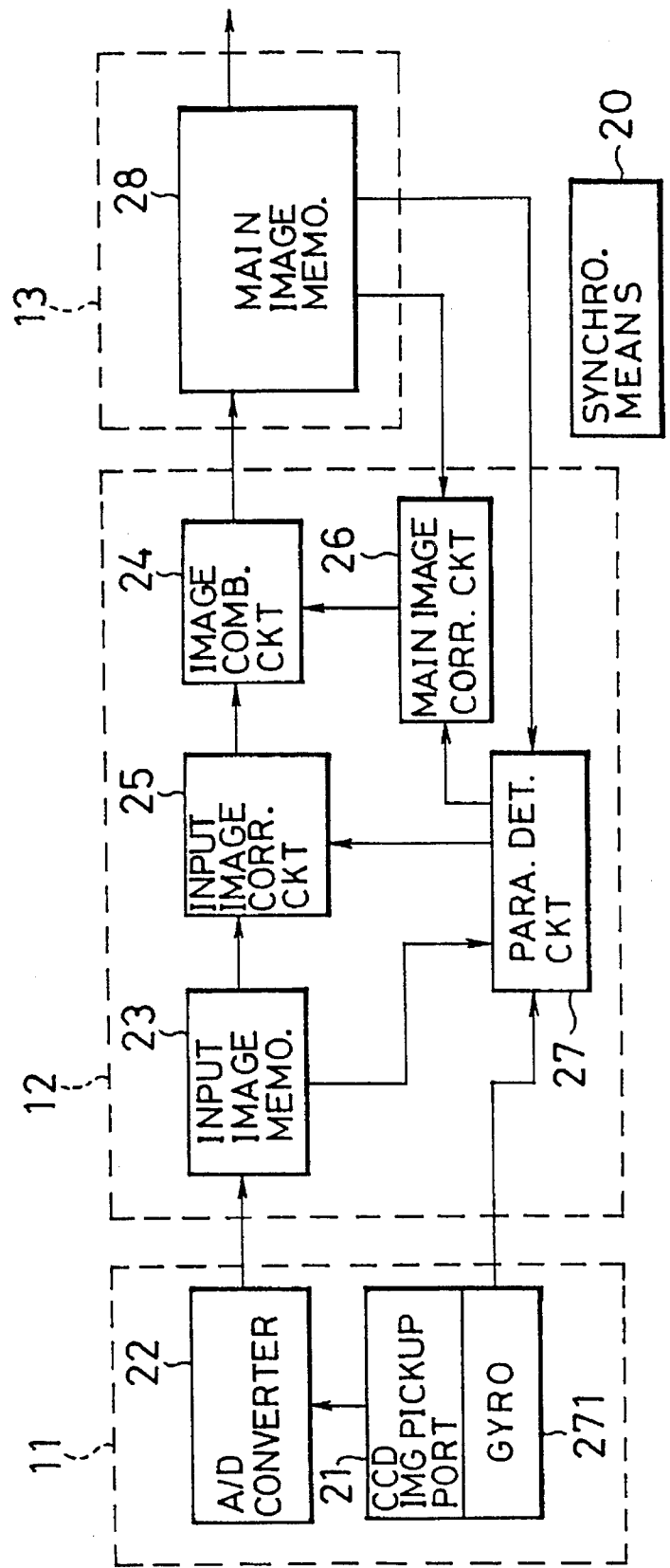

| REP. POINT NO. | REP. PNT COORDINATE | | MOTION VECTOR | |
|---|---|---|---|---|
| | $X_i$ | $y_i$ | $V_x$ | $V_y$ |
| 0 | $X_o$ | $y_o$ | $vx_o$ | $vy_o$ |
| 1 | $X_1$ | $y_1$ | $vx_1$ | $vy_1$ |
| ⋮ | ⋮ | ⋮ | ⋮ | ⋮ |
| K−2 | | | | |
| K−1 | | | | |

IMAGE PROCESSING APPARATUS FOR COMBINING DIFFERENTLY CORRECTED IMAGES

BACKGROUND OF THE INVENTION

1. Field of the Invention

The present invention relates to an image processing apparatus, into which image data is input and in which the input data is processed to produce a high resolution image.

2. Description of the Related Art

The following methods are conventionally known to input a high resolution image or a panorama image:

(1) Method to use a high resolution image pickup device:

A high resolution image may be input by using a high resolution image pickup device as input means of an image processing apparatus.

(2) Method for a line sensor to scan:

This method is a technique in popular use in image scanners, facsimile devices, copiers, or the like mainly as a contact type image scanner, in which each reading operation of a linear CCD sensor obtains a linear image in a horizontal scanning direction and in which the vertical scanning is carried out in a mechanical and optical manner thereby to input image information.

The below Reference 1 describes a trial to obtain a panorama image by the vertical scanning of a noncontact line image sensor in a mechanical and optical manner.

(Ref. 1) Tsuji (Osaka Univ., Faculty of Fund. Engi.) "Panoramic expression of environment", J. of Institute of Electronics, Information and Communication Engineers of Japan (IECEJ), Vol. 74, No. 4, pp 354–359, (1991).

(3) Method using a plurality of image pickup devices

This method is described in the following Reference 2 to Reference 5, in which image information is obtained from a plurality of image pickup devices the relative positional relations of which are known and in which the obtained image information pieces are joined with one another to obtain a high resolution image.

(Ref. 2) Aizawa (Tokyo Univ., Fac. Engi.), Saito and Komatsu (Kanagawa Univ., Fac. Engi.), "Fundamental studies for obtaining ultra high definition image-high definition image acquisition through stereo image processing", IE 90-54 (1990).

(Ref. 3) Uehira (NTT HI Lab.) "High speed still image input method by image pickup region combining method", Briefs 1991 Spring Nat. Conf., IECEJ, pp 7–103.

(Ref. 4) Uehira and Matsuki (NTT) "High speed high definition document reading technique by image pickup region combining method", Briefs 18 1989 Nat. Conf., Inst. Img Electro. Jap. (IIEJ), pp 75–78.

(Ref. 5) Uehira (NTT) "Optical connection type still image camera", J. IIEJ., Vol. 20, No. 3, pp 203–208, (1991).

(4) Method to put images together:

This method is described in the following Reference 6 to Reference 8, in which a plurality of images input in time series are joined together to input a panorama image or a wide range image.

(Ref. 6) Okada, Ohta, and Sakai (Kyoto Univ., Fac. Engi.) "Hand scan type document image input apparatus having real time image joining function", IE 81-17 (1981).

(Ref. 7) Yoshizawa, Hanamura, and Tominaga (Waseda Univ.) "Composition of background image considering panning of dynamic image", Briefs 1990 Spring Nat. Conf., IECEJ, pp 7–51.

(Ref. 8) Nakamura and Kaneko (Tokyo Rika Univ.), and Hayashi (NHK Broadcasting Tech. Lab.) "Production method of panorama image by division image pickup" Briefs 1991 Spring Nat. Conf., IECEJ, pp 7–165.

(5) Method to vibrate an image pickup device:

This method is described in the following Reference 9, in which a CCD image pickup device is vibrated to obtain a doubled resolution image in the vibration direction.

(Ref. 9) Yoshida, Endo, and Harada (Toshiba Inc.) "High resolution process of CCD by swing image pickup", IE 83-65 (1983).

There are, however, the following problems present in the above image input methods.

(a) In the "method to use a high resolution image pickup device" as described in (1) in the above conventional techniques, the number of pixels in an input image depends upon the image pickup device, and, therefore, it is impossible to input an image with the number of pixels more than the capacity of the image pickup device.

(b) In the "method for a line sensor to scan" as described in (2) in the above conventional techniques, the number of pixels in the horizontal scanning direction is limited to that of the line sensor in the same reason as in above (a), and the image alignment cannot be fine without precise mechanical and optical scan in the vertical scanning direction so as to fail to input a fine image.

(c) In the "method to use a plurality of image pickup devices" as described in (3) in the above conventional techniques, the number of pixels is limited to "(pixel number)×(number of image pickup devices)" in each image pickup device, and the use of the plural image pickup devices inevitably increases the production cost and the scale of image pickup system.

(d) In the "method to join images" as described in (4) in the above conventional techniques, the following problems exist.

In the method as shown in Reference 6, the object image is limited to a binary image, there is a restriction on a direction of scanning performed by an operator, and it is readily influenced by the camera vibration in a direction perpendicular to the scanning direction.

In the method as shown in Reference 7, there is a defect of resolution reduction if two frame images are relatively rotated, magnified, or contracted, because the position alignment is carried out between two frame images only by parallel displacement components between the frames.

In the method as shown in Reference 8, there is a restriction on a positional relation of plural frames, that is, on the displacement amount, the angle, and the like of panning and tilting of camera, and the method is not applicable to parallel displacement of camera, though it is possible to obtain a panorama image as seen from a point.

(e) In the "method to vibrate the image pickup device" as described in (5) in the above conventional techniques, the vibrations are allowed only in one direction, the resolution is at most a double of pixel number of the image pickup device, and a special image pickup device is necessary for accurately synchronizing the amplitude of vibrations with taking-in of image pickup signals.

SUMMARY OF THE INVENTION

The present invention has been accomplished to solve the above various problems. It is an object of the present invention to provide an image processing apparatus which can produce a high definition and wide range image from a plurality of images each having the relatively small number of pixels, and to provide an image processing apparatus which uses a single common image pickup device without specific and strict restrictions on the scanning of image pickup device in input, which can input a multi-valued image exceeding the resolution of the image pickup device in a noncontact manner, which can execute photography of panorama multi-valued image, and which can produce to output a high resolution image even with low resolution images being input.

The above object of the present invention can be achieved by an image processing apparatus comprising:

image storing means for storing an image;

image inputting means for inputting an image;

image combining means for conducting a combination process of the image stored in the image storing means and the image input through the image inputting means; and image comparing means for comparing the image stored in the image storing means with the image input through the image inputting means;

wherein the image combining means conducts the image combination, based upon a difference between the two images obtained by the image comparing means.

The image comparing means compares the two images when the image combining means combines the image input through the image inputting means and the image stored in the image memory. The combination process is carried out with parameters obtained from the difference between the images obtained upon the comparison.

Further objects and advantages of the present invention will be apparent from the following description, reference being had to the accompanying drawings wherein preferred embodiments of the present invention are clearly shown.

BRIEF DESCRIPTION OF THE DRAWINGS

FIG. 27 is a constitutional drawing of the fifth embodiment;

DESCRIPTION OF THE PREFERRED EMBODIMENTS

First Embodiment

The following describes an embodiment of an image processing apparatus according to the present invention, which enables production of a high resolution and wide range image, referring to the accompanying drawings.

Figure 2:
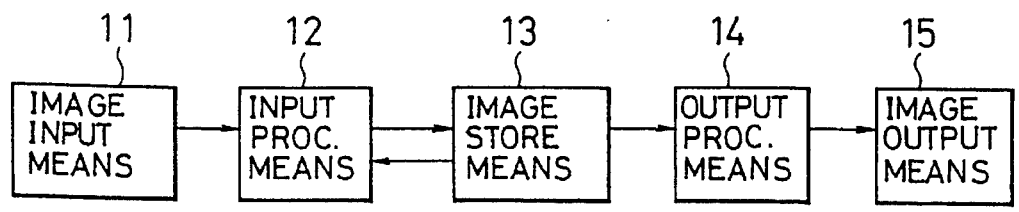
FIG. 2 is a constitutional drawing of an image producing apparatus according to the present invention.

The hardware of the image processing apparatus in the present embodiment comprises, as shown in FIG. 2, image inputting means 11, input processing means 12, image storing means 13, output processing means 14, and image outputting means 15.

The image inputting means 11 is a device to carry out the photoelectric conversion of an image into digital data, which for example comprises a CCD camera, an A/D converter, and peripheral circuits. The input processing means 12 is a device to process the image data converted by the image inputting means into digital signal and image data in the image storing means 13, which for example comprises a DSP, an LSI, a semiconductor memory, and peripheral circuits.

The image storing means 13 is means to store the image data output from the input processing means 12, which for example comprises a semiconductor memory and peripheral circuits. The output processing means 14 is a device to convert the image data in the image storing means 18 into a form capable of being output to the outputting means 15, which for example comprises an IC or LSI, a semiconductor memory and peripheral circuits. The outputting means 15 is a device to display or to print out the image data converted by the output processing means into the appropriate form, which for example comprises a printing apparatus or a display device.

Figure 1:
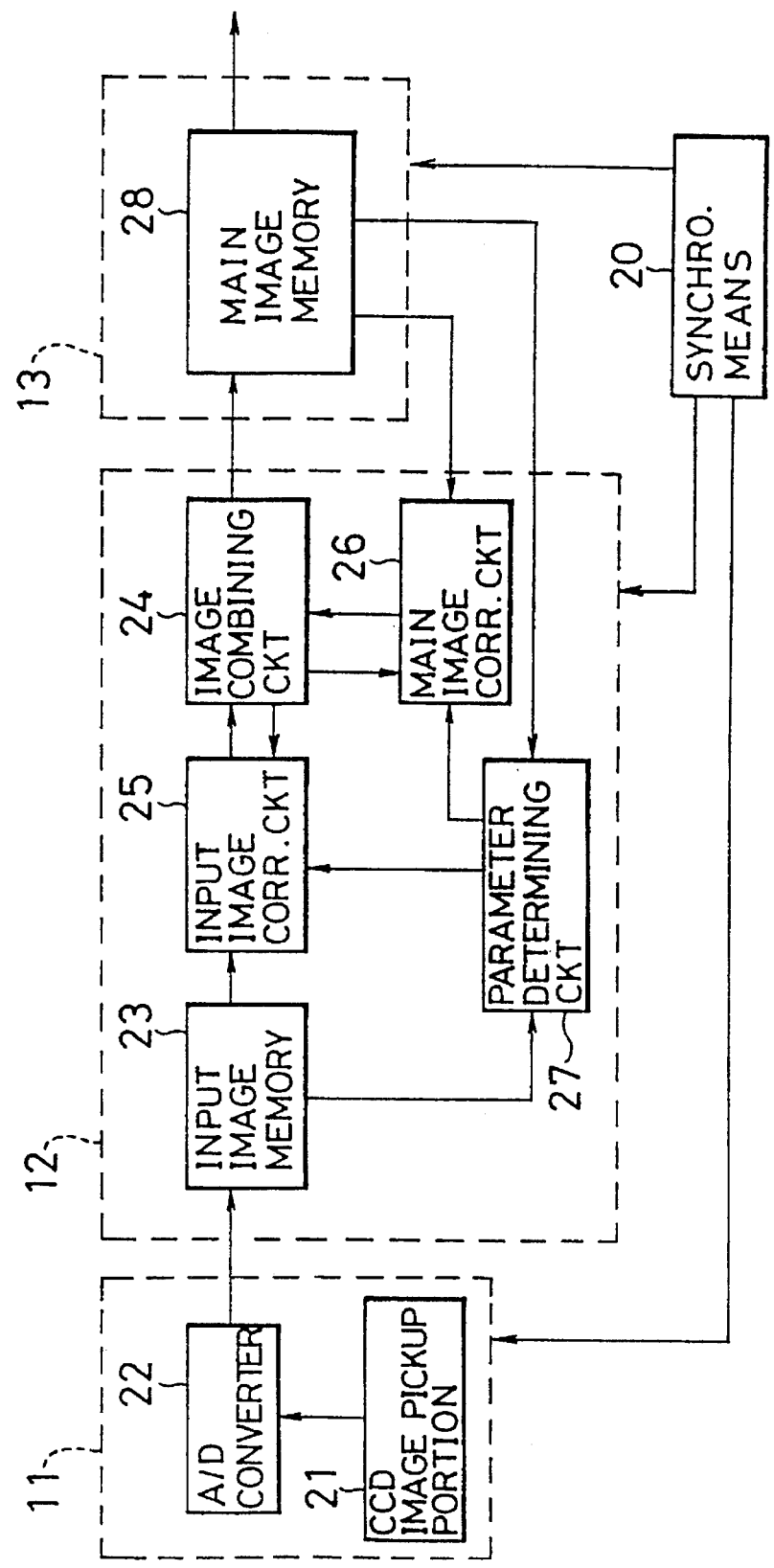
FIG. 1 is a constitutional drawing of the first embodiment.

FIG. 1 is a drawing to show an example of arrangement of the image inputting means 11, the input processing means 12, and the image storing means 13 in the present embodiment.

The present embodiment shows an example of an apparatus in which a plurality of frame images are continuously picked up while an operator is carrying out panning of camera carried by its hands, whereby producing a panorama image in a range in which the images are picked up.

Figure 12:
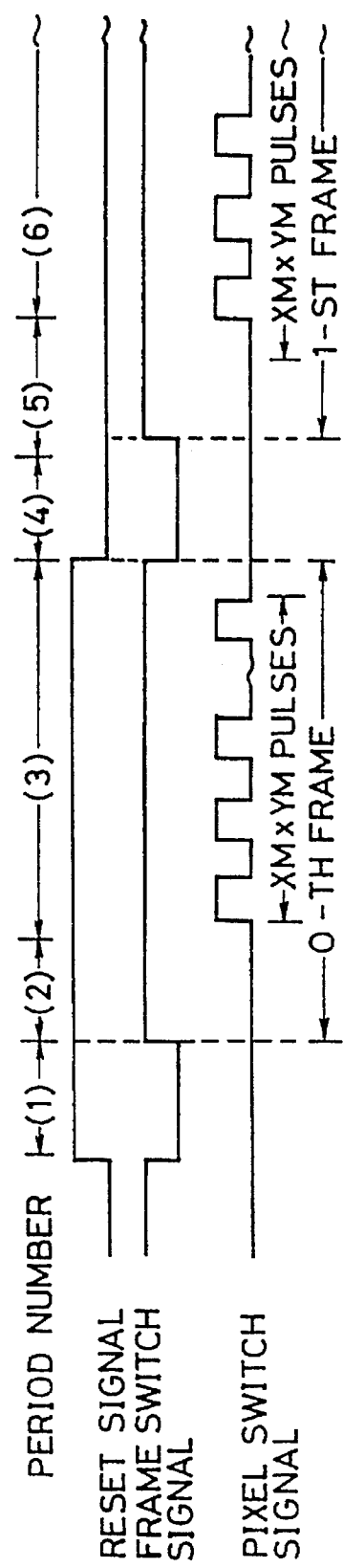
FIG. 12 is a drawing to illustrate a relation among synchronizing signals.

In FIG. 1, synchronizing means 20 comprises a digital circuit, which outputs synchronizing pulse signals to various means for synchronizing the processes of the image inputting means 11, the input processing means 12, and the image storing means 13. There are three kinds of synchronizing pulse signals generated by the synchronizing means 20. In detail, as shown in FIG. 12, the signals are as follows:

Reset signal: A binary signal to reset the system, which holds an active state before the first frame switch signal, which first appears after the reset signal became active, turns into an non-active state.

Frame switch signal: A binary signal which becomes active for each frame to be processed and holds the active state while the process for the frame is carrying out.

Pixel switch signal: A binary pulse signal generated for each process of a pixel in the main memory.

Functions of these signals in FIG. 12 will be detailed later.

The image inputting means 11 of FIG. 1 comprises a CCD image pickup portion 21 and an A/D converting circuit 22. The CCD image pickup portion 21 comprises a CCD element and peripheral circuits, which executes the photoelectric conversion of an image in synchronism with the frame switch signal in the synchronizing signals input from the synchronizing means 20 to output an electric signal to the A/D converting circuit 22.

The A/D converting circuit 22 comprises an A/D converter and peripheral circuits, which executes the A/D conversion of the electric signal supplied from the CCD image pickup portion 21 in synchronism with the signal input from the synchronizing means 20, that is, in a period between a timing when the frame switch signal turns into non-active state or when the reset signal turns into an active state and a timing when the frame switch signal again turns into an active state, to output digital image data for one screen to an input image memory 23. This image data for one screen will be hereinafter referred to as a frame.

The input processing means 12 comprises an input image memory 23, an image combining circuit 24, an input image correcting circuit 25, a main image correcting circuit 26, and a parameter determining circuit 27.

The input image memory 23 comprises a semiconductor memory and peripheral circuits, which stores the digital image data input from the A/D converting circuit before next data is input and which outputs respective pixel values corresponding to coordinates input from the parameter determining circuit 27 and the input image correcting circuit 25, to the respective circuits. In case that a coordinate at which no pixel is present in the memory is input, 0 is output.

The number of pixels in the input image memory is determined by the number of pixels in one frame in the image inputting means, which is smaller than that in the main image memory.

In the present embodiment, the input image memory 23 has pixels of XI in the horizontal direction and YI in the vertical direction, each of the pixels storing lightness information of one of GI gradations. Let a pixel value be I (i, j) at a coordinate (i, j) in the input image memory, where $0 \leq i < XI$, $0 \leq j < YI$, $0 \leq I(i, j) < GI$, and i, j, and I (i, j) are integers.

The image combining circuit 24 comprises a digital calculating circuit, which outputs a coordinate value to the input image correcting circuit 25 and to the main image correcting circuit 26 and which calculates pixel data obtained as a result of the coordinate output from the respective circuits to output a value of calculation result together with the coordinate value to the main image memory 28. The details of the operation of the image combining circuit 24 will be described later.

The input image correcting circuit 25 comprises a digital calculating circuit, a semiconductor memory, and peripheral circuits, which effects the transformation correction on the digital image data stored in the input image memory 23 with parameters input from the parameter determining circuit 27 and which outputs to the image combining circuit 24 pixel data corresponding to the coordinate value input from the image combining circuit 24. This operation of the input image correcting circuit 25 will be detailed later.

In the present embodiment, the correction process in the input image correcting circuit 25 is described by a function $F_i$ for brevity of description, so that the corrected pixel value at coordinate (k, l) may be expressed as $F_i$ (k, l). In the expression, $0 \leq k < XM$, $0 \leq l < YM$, $0 \leq F_i(k, l) < GM$, and k, l, and $F_i$ (k, l) are integers.

The main image correcting circuit 26 comprises a digital calculating circuit, a semiconductor memory, and peripheral circuits, which executes the coordinate transformation of the image data in the main image memory 28 with the parameters input from the parameter determining circuit 27 and which outputs to the image combining circuit 24 the pixel data corresponding to the coordinate value input from the image combining circuit 24. This operation of the main image correcting circuit 26 will be detailed later.

In the present embodiment, the correction process in the main image correcting circuit 28 is expressed by a function $F_m$ for brevity of description, so that the corrected pixel value at a coordinate (k, l) may be expressed by $F_m$ (k, l). In the expression, $0 \leq k < XM$, $0 \leq l < YM$, $0 \leq F_m(k, l) < GM$, and k, l and $F_m$ (k, l) are integers.

The parameter determining circuit 27 comprises a digital calculating circuit, a semiconductor memory, and peripheral circuits, which compares image data values respectively stored in the input image memory 23 and in the main image memory 28 with each other and which outputs the correction parameters to the input image correcting circuit 25 and to the main image correcting circuit 26. The details of this operation of the parameter determining circuit 27 will be described later.

The image storing means 13 comprises a main image memory 28. The main image memory 28 comprises a semiconductor memory and peripheral circuits, into which a coordinate and a pixel value are input from the image combining circuit 24 and in which the pixel value is written in a memory region corresponding to the input coordinate. With a coordinate input from the parameter determining circuit 27 and the image correcting circuit 26, the main image memory 28 outputs a pixel value corresponding to the input coordinate to the respective circuits. In case that a coordinate at which no pixel exists in the memory is input, 0 is output.

The main image memory 28 clears all pixel values into zero after the reset signal from the synchronizing means 20 turns into an active state and before the frame switch signal turns into an active state.

The number of pixels in the main image memory 28 is greater than that in the input image memory. In the present embodiment, the main image memory 28 has pixels of XM×YM, each pixel storing lightness information of one of GM gradations. Let a pixel value at a coordinate (m, n) in the main image memory be M(m, n), where $0 \leq m < XM$, $0 \leq n < YM$, $0 \leq M(m, n) < GM$, and m, n, and M(m, n) are integers.

Details of the process in FIG. 1

There are below described in detail the operations of the image combining circuit 24, the input image correcting circuit 25, the main image correcting circuit 26, and the parameter determining circuit 27.

Description of the image combining circuit 24

Figure 3:
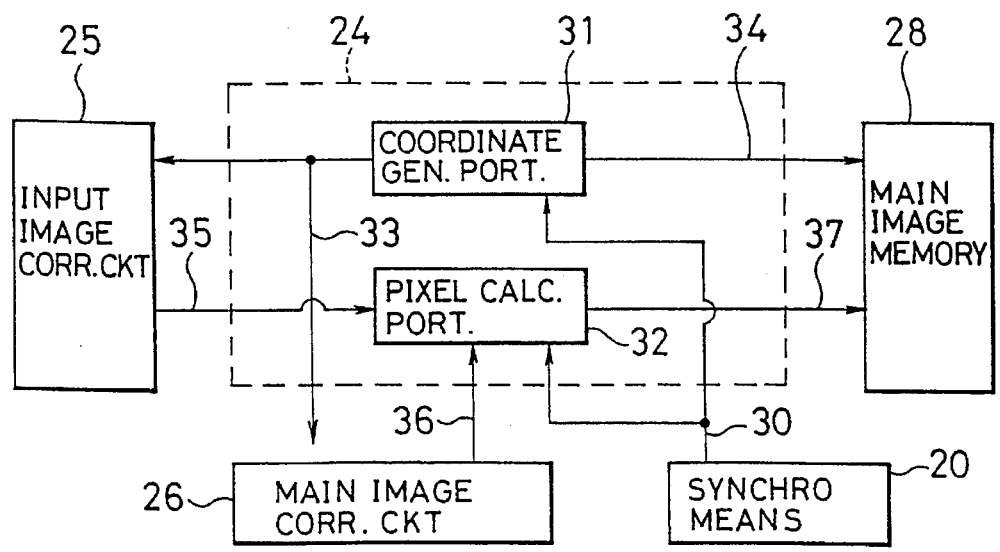
FIG. 3 is a constitutional drawing of an image combining circuit in the first embodiment.

The image combining circuit 24 comprises a coordinate generating portion 31 and a pixel calculating portion 32 as shown in FIG. 3, into which pixel values corresponding to a coordinate value of the main image memory produced by the coordinate generating portion 31 are input from the input image correcting circuit 25 and from the main image correcting circuit 26 and which writes the calculation result in a region corresponding to the above coordinate value in the main image memory.

Figure 4:
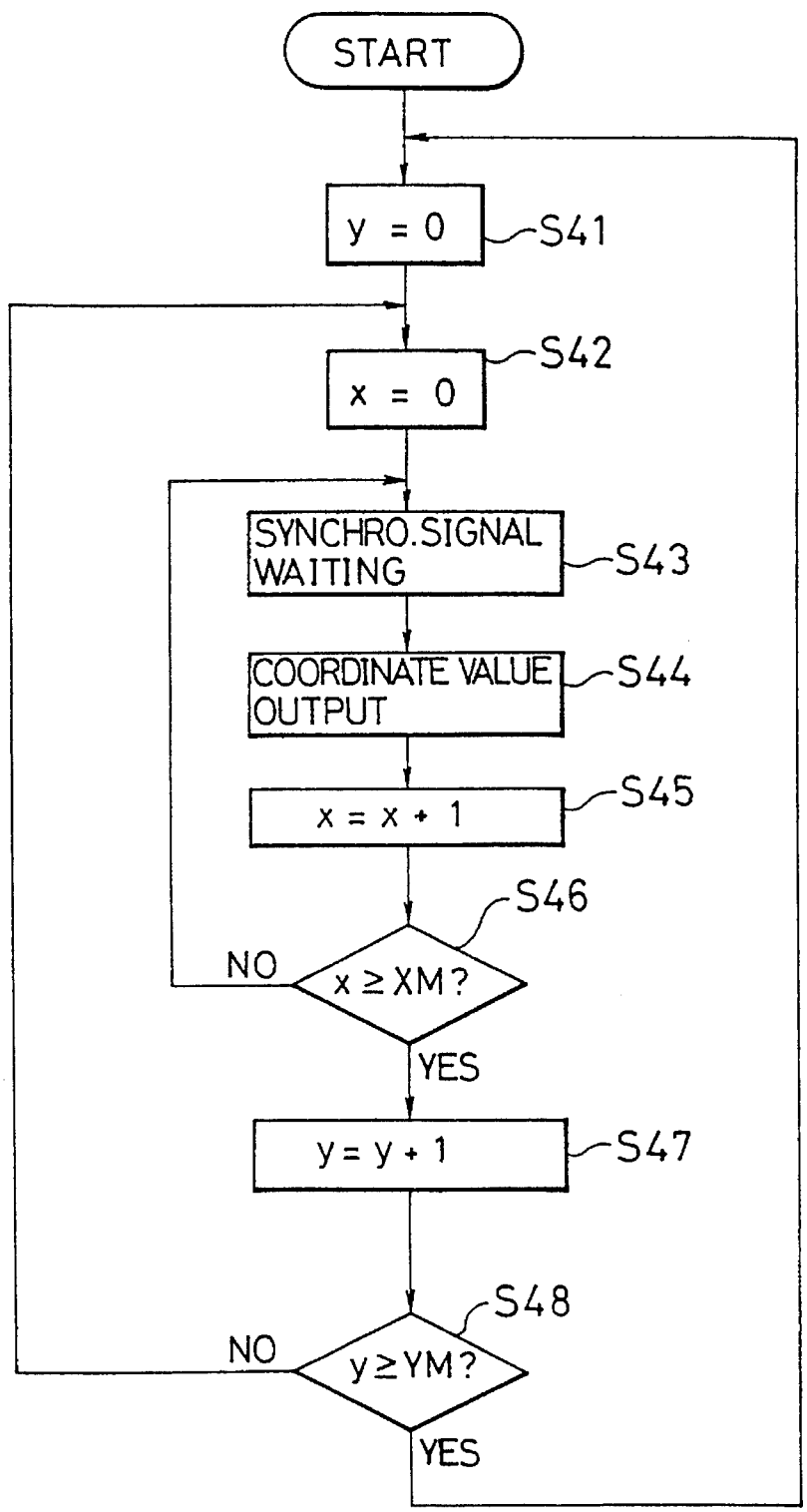
FIG. 4 is a flowchart to show a process of a coordinate generating portion.

The coordinate generating portion 31 generates all the coordinate values present in the main image memory in the order of raster in synchronism with the pixel switch pulse signal in the synchronizing signals 30 from the synchronizing means 20. In detail, counters of X and Y directions inside the portion 31 are given an increment by the synchronizing signals as shown in the flowchart of FIG. 4.

At S41 a value y of the Y counter is reset to 0.

At S42 a value x of the X counter is reset to 0.

At S43 the process is suspended until the pixel switch pulse starts rising.

At S44 a set (x, y) of current values of the X, Y counters are output through signal lines 33 and 34.

At S45 the value x of the X counter is given an increment of 1.

At S46 the value x of the X counter is compared with an X directional pixel number XM of the main image memory. If $x \geq XM$, the flow proceeds to S47, while if $x < XM$, the process starting from S43 is again carried out.

At S47 the value y of the Y counter is given an increment of 1.

At S48 the value y of the Y counter is compared with a Y directional pixel number YM of the main image memory. If $y \geq YM$, the process from S41 is carried out, while if $y < YM$, the process from S42 is again carried out.

The pixel calculating portion 32 of FIG. 3 takes in pixel values through respective signal lines 35 and 36 from the input image correcting circuit 25 and from the main image correcting circuit 26 in synchronism with the synchronizing signals 30 from the synchronizing means 20, that is, at a timing when the pixel switch signal is changed from active to non-active. The pixel calculating portion 32 executes the calculation of below Equation 1 with the pixel values and outputs the calculation result through a signal line 37 to the main image memory 28 before the pixel switch signal is again turned into active.

Equation 1

$M = \alpha \times F_i + (1-\alpha) \times F_m$, if $F_i > 0$ and $F_m > 0$;
$M = F_m$, if $F_i = 0$;

-continued

Equation 1

$M = F_i$, if $F_m = 0$;
$M = 0$, if $F_i = F_m = 0$;

If $M \geq GM$ then $M = GM$;

where $\alpha$ is a constant preliminarily determined as $0 < \alpha < 1$,

M is a pixel value output through the signal line 37, $F_i$ is a pixel value input through the signal line 35, and $F_m$ is a pixel value input through the signal line 36, under the condition that while the reset signal is in active the following calculation of Equation 2, that is, a process to write only the input data from the input image correcting circuit 25 into the main image memory 28, is carried out.

Equation 2

$M = F_i$

If $M \geq GM$ then $M = GM$.

Description of the input image correcting circuit 25

Figure 5:
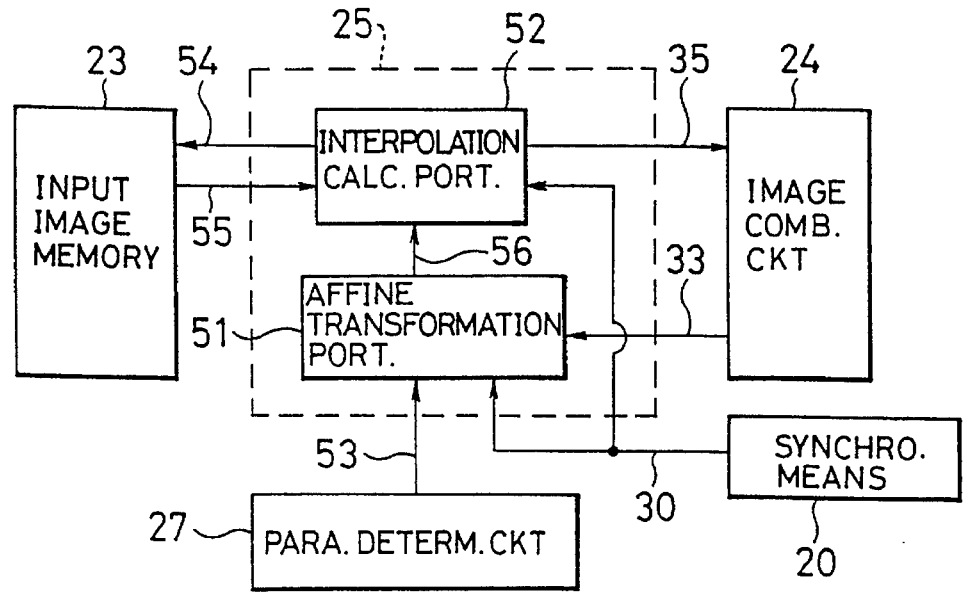
FIG. 5 is a constitutional drawing of an input image correcting circuit in the first embodiment.

The input image correcting circuit 25 comprises an affine transformation portion 51 and an interpolation calculating portion 52 as shown in FIG. 5.

The affine transformation portion 51 executes the following process.

(1) Affine transformation coefficients are input through a signal line 53 from the parameter determining circuit 27 after the frame switch signal of the synchronizing signal 30 has risen and before the pixel switch signal starts rising.

(2) Every time when the pixel switch signal rises, a coordinate value input through the signal line 33 from the image combining circuit 24 is transformed by the following Equation 3 and the result is output through a signal line 56.

Equation 3

$$(x', y', 1) = (x, y, 1) \begin{bmatrix} p_{00} & p_{01} & 0 \\ p_{10} & p_{11} & 0 \\ p_{20} & p_{21} & 1 \end{bmatrix},$$

where matrix elements $p_{ij}$ are affine transformation coefficients input from the parameter determining circuit 27, (x, y) is a coordinate value input through the signal line 33, and (x', y') is a coordinate value output through the signal line 56.

The interpolation calculating portion 52 executes the following process.

(3) The coordinate value, which is the result of the process in above (2) in the above affine transformation portion 51, is input through the signal line 56 from the affine transformation portion 51.

(4) A pixel interpolation calculation process by the cubic interpolation method as shown in below Equation 4 is made on the input coordinate value while the pixel switch signal is in active, and the obtained result is output through the signal line 35 to the image combining circuit 24.

Interpolation method 1: cubic interpolation method $$M = \Sigma m n \Sigma \, I(m, n) \times c(x' - m) \times c(y' - n), \quad \text{Equation 4}$$

-continued
where $$c(a) = \begin{bmatrix} 1 - 2x|a|^2 + |a|^3 & , 0 \geq |a| < 1; \\ 4 - 8x|a| + 5x|a|^2 - |a|^3 & , 1 \leq |a| < 2; \\ 0 & , 2 \leq |a| \end{bmatrix}.$$

In the above equation, the summation range is between sixteen pixels as defined below in the proximity of a coordinate (x', y') input through the signal line 56.

$$x'-2 \leq m < x'+2; \; y'-2 \leq n < y'+2,$$

where m and n are integers.

In Equation 4, M designates a pixel value output through the signal line 35, and I (m, n) does a process to output a coordinate value (m, n) through the signal line 54 to the input image memory 23 and to obtain a pixel value corresponding to the coordinate value through the signal line 55 from the input image memory 23.

The pixel interpolation process may be done not only by the above cubic interpolation method but also by the bilinear interpolation method or by the nearest proximity method as described below.

Interpolation method 2: bilinear interpolation method
Equation 5

$$M = I(x'', y'') \times (1-\beta) \times (1-\gamma) + I(x''+1, y'') \times \beta \times (1-\gamma) + I(x'', y''+1) \times (1-\beta) \times \gamma + I(x''+1, y''+1) \times \beta \times \gamma$$

Interpolation method 3: nearest proximity method

| Equation 6 | |
|---|---|
| M=M (x'', y'') | if $\beta \leq 0.5$ and $\gamma \leq 0.5$; |
| M=M (x''+1, y'') | if $\beta > 0.5$ and $\gamma \leq 0.5$; |
| M=M (x'', y''+1) | if $\beta \leq 0.5$ and $\gamma > 0.5$; |
| M=M (x''+1, y''+1) | if $\beta > 0.5$ and $\gamma > 0.5$. |

The above pixel interpolation methods are described in the following Reference 10.

(Ref. 10) "Handbook of image processing" published by Shokodo, pp 274–275.

Description of the main image correcting circuit 26

Figure 6:
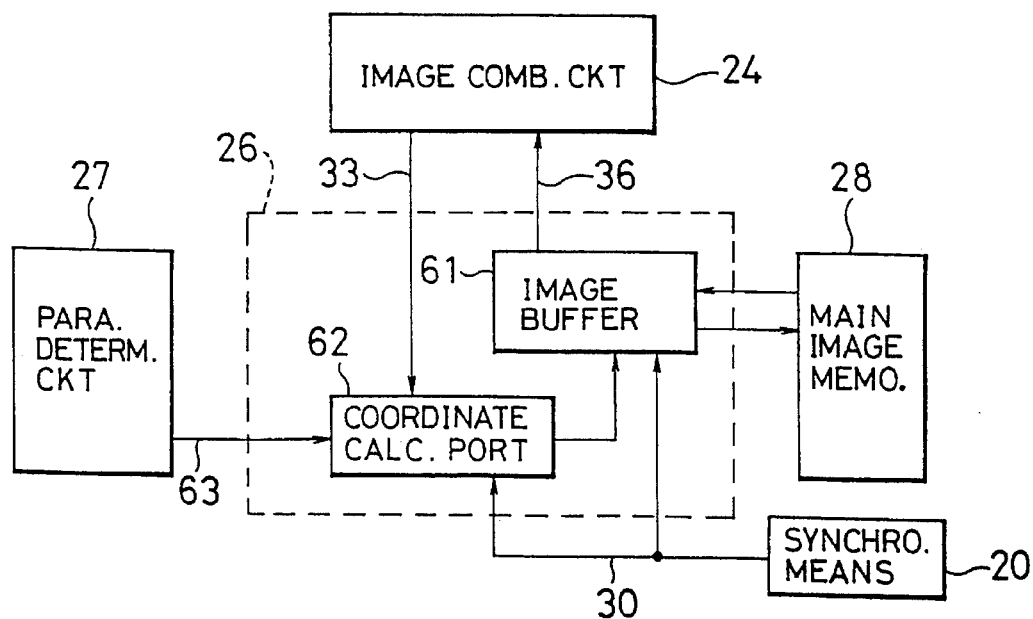
FIG. 6 is a constitutional drawing of a main image correcting circuit in the first embodiment.

The main image correcting circuit 26 comprises an image buffer 61 and a coordinate calculating portion 62 as shown in FIG. 6. The image buffer 61 is an image memory having the same capacity as the main image memory 28, which copies the entire contents of the main image memory 28 during a period between a timing when the frame switch signal in the synchronizing signals 30 from the synchronizing means 20 turns into non-active and a timing when the frame switch signal again turns into active. This copying process is not carried out if the reset signal is in active.

The image buffer 61 outputs a pixel value corresponding to a coordinate value input from the coordinate calculating portion 62, through the signal line 36 to the image combining circuit 24.

The coordinate calculating portion 62 executes the following process.

(1) Coefficients ($q_x$, $q_y$) for coordinate transformation are input through a signal line 63 from the parameter determining circuit 27 in a period between a timing when the frame switch signal in the synchronizing signals 30 from the synchronizing means 20 is turned into active and a timing when the pixel switch signal is turned into active.

(2) A coordinate value input from the image combining circuit 24 is transformed by the following Equation 7 when the pixel switch signal is turned into active, and the transformed coordinate value is output to the image buffer 61.
Equation 7

$$(x', y') = (x + q_x, y + q_y),$$

where coefficients $q_x$ and $q_y$ are integers input from the parameter determining circuit 27, (x, y) is a coordinate value input through the signal line 33 from the image combining circuit 24, and (x', y') is a coordinate value output to the image buffer 61.

(3) After above, a pixel value corresponding to the coordinate (x', y') is output from the image buffer 61 to the image combining circuit.

The above process of (2) and (3) is carried out while the pixel switch signal is in active, but are not carried out while the reset signal is in active.

In the above process, the main image correcting circuit 26 conducts the parallel displacement of the image data in the main image memory by the integer values ($q_x$, $q_y$) and carries out the output process of the processed data to the image combining circuit 24.

Description of the parameter determining circuit 27

Figure 7:
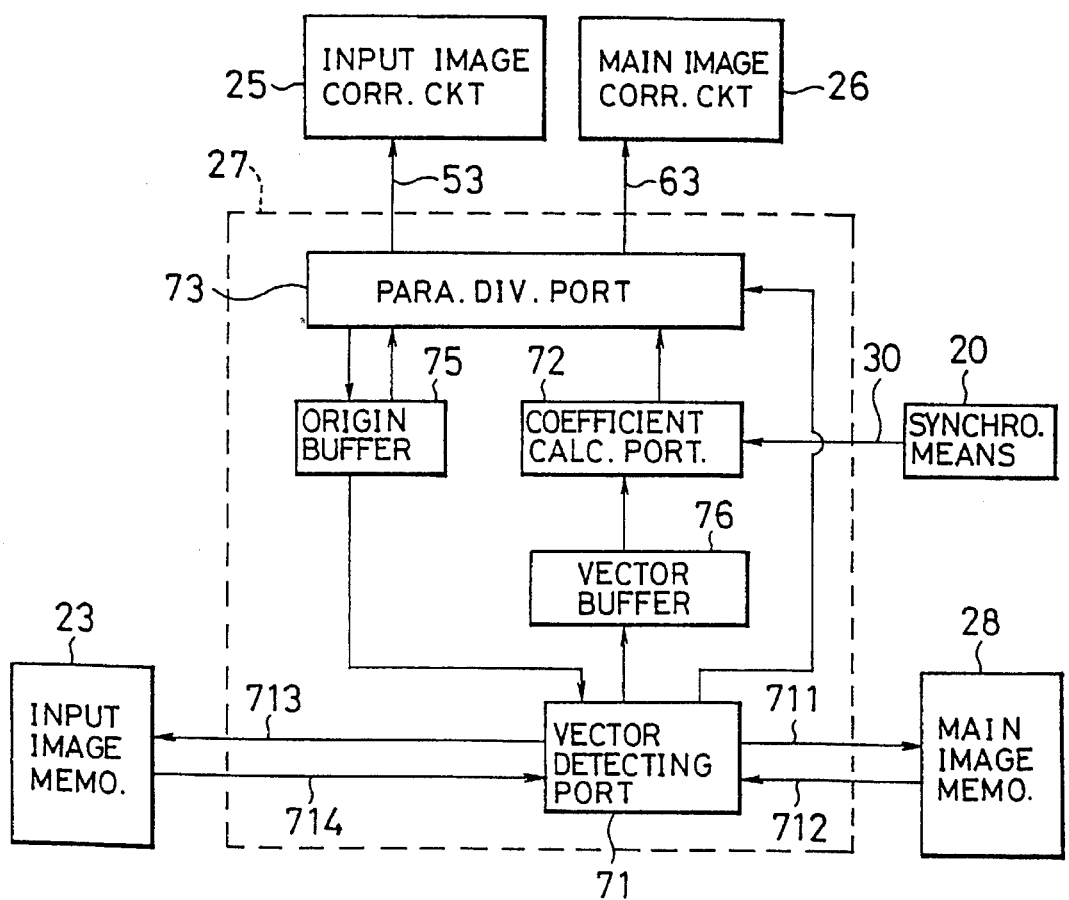
FIG. 7 is a constitutional drawing of a parameter determining circuit in the first embodiment.

The parameter determining circuit 27 comprises a vector detecting portion 71, a vector buffer 76, a coefficient calculating portion 72, a parameter dividing portion 73, and an origin buffer 75 as shown in FIG. 7, which executes processes in synchronism with the synchronizing signals 30 from the synchronizing means 20.

The origin buffer 75 stores a matching origin coordinate value ($X_0$, $Y_0$) where $X_0$ and $Y_0$ are integers, which is for use in the vector detecting portion 71, the coefficient calculating portion 72, and the parameter dividing portion 73. The matching origin coordinate value is rewritten at each process end of one screen by the parameter dividing portion 73 in synchronism with the synchronizing signals 30 from the synchronizing means 20.

Figure 8:
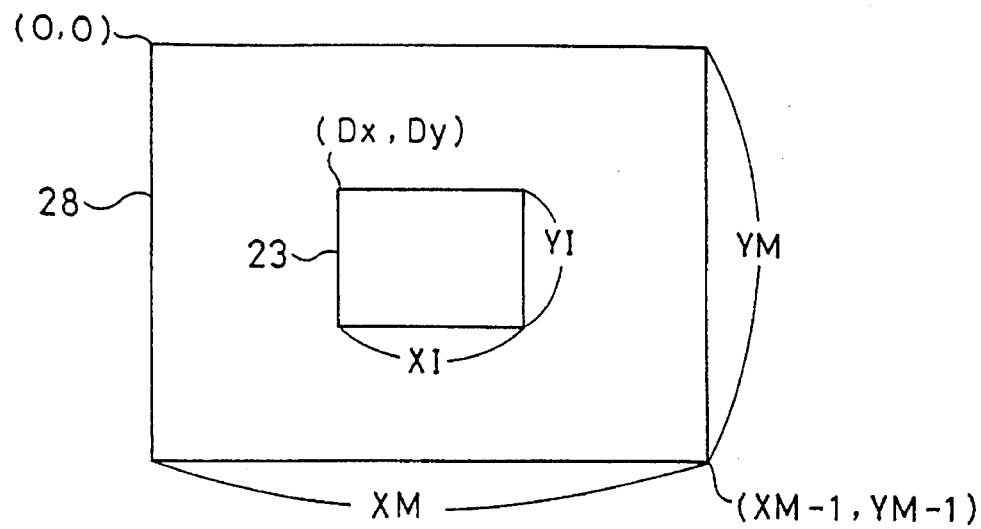
FIG. 8 is a drawing to illustrate a relation between a main image and an input image in the first embodiment.

An initial value is set as ($X_0$, $Y_0$) = ($D_x$, $D_y$), where ($D_x$, $D_y$) are constants calculated by the following equations since the input image should be disposed at the center of the main image memory 28 as shown in FIG. 8, which is written by the parameter dividing portion 73 when the reset signal in the synchronizing signals 30 is turned into active:

$$D_x = int\{(XM-XI)/2\};$$

$$D_y = int\{(YM-YI)/2\},$$

where int {a} is a maximum integer not exceeding a,

XM and YM are numbers of pixels in the x- and the y-directions of the main image memory 28, and XI and YI are numbers of pixels in the x- and the y-directions of the input image memory 23.

Figures 29, 30:
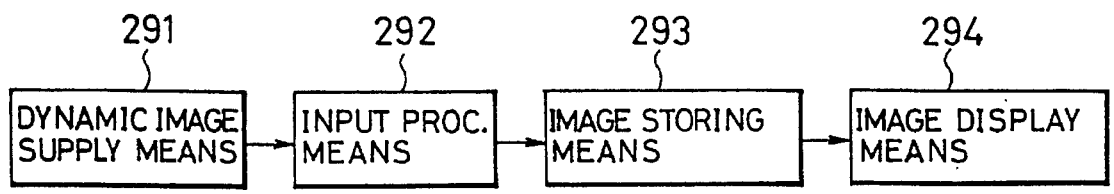
FIG. 29 is a constitutional drawing of the seventh embodiment.
FIG. 30 is a drawing to show an example of representative points.

A vector buffer 76 is temporary memory means for storing in the form of table as shown in FIG. 30 coordinate values of representative points and motion vector values at the respective representative points, which comprises a semiconductor memory and peripheral circuits. Writing in and reading out of the vector buffer 76 are carried out by the vector detecting portion 71, and the coefficient calculating portion 72 reads data out of the vector buffer 76.

The vector detecting portion 71 compares image data in the main image memory 28 with image data in the input image memory 23 to obtain motion vectors at a plurality of representative points set in an input image.

The following is the description of a representative point determining portion. In the present embodiment, K of representative points are taken in an input image, and coordinates of the representative points are defined as $(x_i, y_i)$, where i=0 to (K−1), $0 \leq x_i < XI$; $0 \leq y_i < YI$.

Figures 9A, 9B:
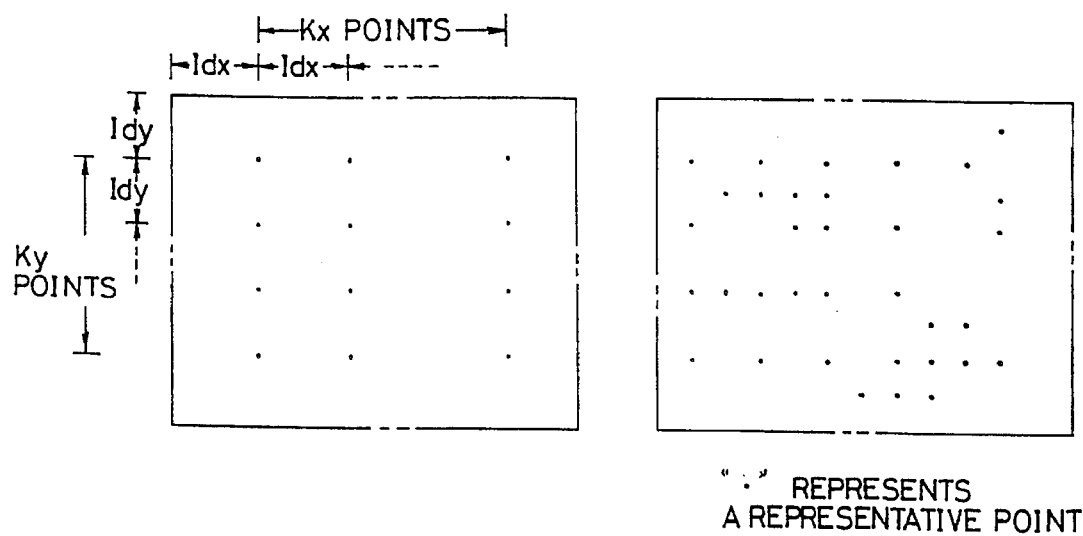
FIG. 9a and 9b are drawings to show an example of representative points in the parameter determining circuit.

The setting of the plural representative points may be conducted as follows in the input image: as shown in FIG. 9a, they are determined at a period preliminarily determined in the horizontal and the vertical directions; or as shown in FIG. 9b, they may be determined in each input image as to be concentrated in the edge portion and in regions having locally large statistical pixel values.

In case that the representative points are periodically set as shown in FIG. 9a, coordinates of the representative points are determined for example by the following equations. Supposing there are representative points of Kx in the x-direction and of Ky in the y-direction at intervals of $I_{dx}$ and $I_{dy}$ pixels, a coordinate of i-th representative point $(x_i, y^i)$ is obtained by the following equations.

$$x_i = I_{dx} \times \{1 + (i \bmod K_x)\};$$

$$y_i = I_{dy} \times \{1 + int(i/K_y)\},$$

where $I_{dx} = int\{XI/(K_x+1)\}$, $I_{dy} = int\{YI/(K_y+1)\}$, $K_x$ and $K_y$ are numbers of representative points in the x-direction and in the y-direction, which are integers satisfying $K_x \times K_y = K$, and (a mod b) shows a residue when a is divided by b.

These coordinates of the representative points are independent of the input image, and, therefore, the coordinates of the K representative points are preliminarily written in a section of "representative point numbers" in the above vector buffer.

In case that the coordinates of the representative points vary depending upon the input image as shown in FIG. 9b, the coordinates of the representative points have to be determined for example by the following process.

Figure 10A:
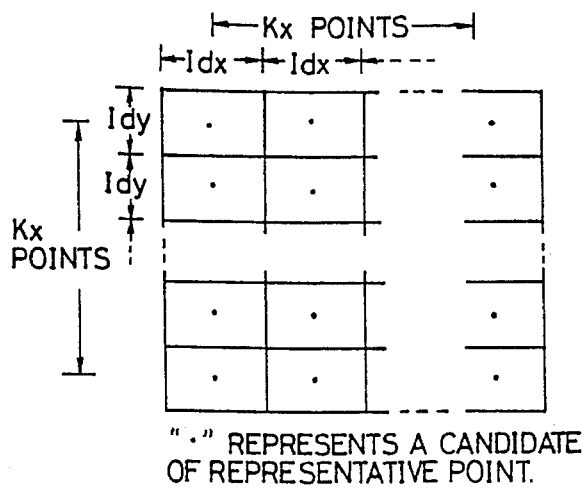
FIG. 10a and 10b are drawings to illustrate a selection method of the representative points.
Figure 10B:
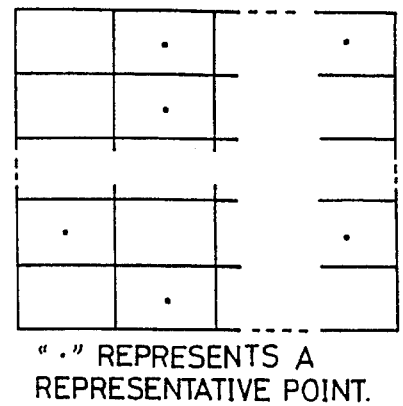

(1) An image in the input image memory is divided into blocks of ($K_x \times K_y$) as shown in FIG. 10a. In this division, the number ($K_x \times K_y$) of blocks is greater than the number K of necessary representative points.

(2) Statistical values of pixel data (for example either a difference between the maximum and the minimum or the dispersion) are calculated in all blocks.

(3) K blocks are selected from the largest statistical value calculated in above (2), and a coordinate of the center of a selected block is set as a coordinate of i-th representative point.

The following means is used to achieve the above processing method. In detail, a left upper coordinate ($B_{xj}, B_{yj}$) of the j-th block is obtained by the following equations in the block division in above (1).

$$B_{xj} = (j \bmod K_x) \times I_{dx};$$

$$B_{yj} = int(j/K_y) \times I_{dy},$$

where $I_{dx} = int(XI/K_x)$, $I_{dy} = int(YI/K_y)$, $K_x$ and $K_y$ are numbers of blocks in the x-direction and in the y-direction, which are integers satisfying $K_x \times K_y > K$.

Since these coordinates are independent of an input image, the vector detecting portion 71 may be arranged to have a circuit for outputting the block left upper coordinate ($B_{xj}, B_{yj}$) when the block number j is input, such as a lookup table using a semiconductor memory or as a circuit for conducting the above calculation.

The following means is used for the calculation of statistical values in a block in above (2). In detail, the left upper coordinate ($B_{xj}, B_{yj}$) is obtained for the j-th block in above (1), and a statistical value $S_j$ for each block is obtained by the following process as described in C language. As an example, a process is shown to obtain a difference between the maximum value and the minimum value in a block as the statistical value $S_j$.

```
for (j=0; j<(K_x * K_y) ; j ++)
{ x=B_xj;
  y=B_yj;
  max=0;
  min=GI;
  for (n=0; n<K_y; n++)
    { for (m=0; m<K_x; m++)
      { a=I (x+m, y+n) ;
        if (a<max) max=a;
        if (a<min) min=a;
      }
    }
  S[j]=max−min;
}
``` provided that x, y, max, min, and S[j] are integer type variable buffers.

In the above program, "a=b" represents a writing process in which the right side value b is written in the left side buffer a.

Also, $B_{xj}$ and $B_{yj}$ represent processes to obtain a left upper coordinate of the j-th block by the means as shown in above (1).

Further, I (m, n) means a process to output a coordinate value (m, n) through a signal line 713 to the input image memory 23 and then to obtain a pixel value corresponding to the coordinate in the input image memory 23 through a signal line 714.

The following means is used for selection of the representative points in above (3).

[I] An array buffer SS [i] is made by sorting S [j] from the largest. As a result, a value of j having the i-th largest statistical value S [j] is stored in SS [i].

[II] Selected numbers of representative points are from i=0 to i=K−1 of SS [i], so that a coordinate $(x_i, y_i)$ of the i-th representative point may be obtained by the following calculation process.

$$j = SS[i];$$

$$x_i = B_{xj} + int(I_{dx}/2);$$

$$y_i = B_{yj} + int(I_{dy}/2),$$

where $B_{xj}$ and $B_{yj}$ are left upper coordinate values of the block obtained by the means as shown in above (1).

The coordinates $(x_i, y_i)$ of the representative points calculated in the above process are written in a section of "representative point coordinates" of the vector buffer 76 during a period in which the frame switch signal in the synchronizing signals 30 is in non-active after the input image is taken into the input image memory. If the reset signal is in active, the above process is not carried out.

The following is the description of the vector calculating portion in the vector detecting portion 71.

For the respective representative points $(x_i, y_i)$ obtained in the above process, corresponding points on the main image memory $$(x'_i, y'_i),$$

where $i=0$ to $(K-1)$; or motion vectors $$(v_{xi}, v_{yi})=(x'_i-x_i, y'_i-y_i),$$

where $i=0$ to $(K-1)$ are obtained either by the block matching method or by the density gradient method as explained below.

Method 1-1: block matching

Figure 11:
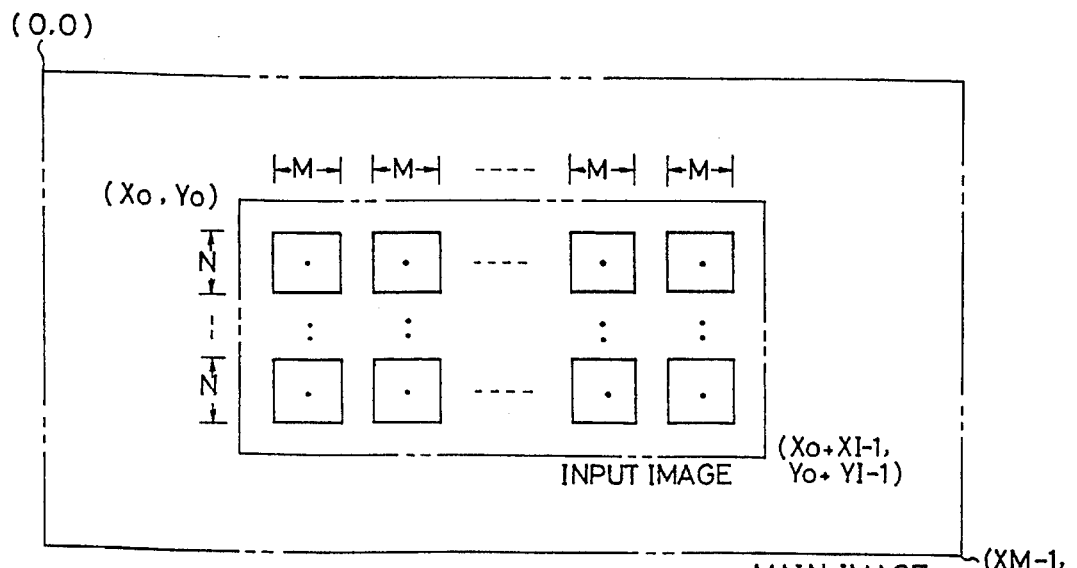
FIG. 11 is a drawing to illustrate block matching.

The first method is a method as generally called as block matching, in which a difference of image from one in the main image memory is calculated in one block of M×N pixels around each representative point as shown in FIG. 11 and motion vectors $(v_{xi}, v_{yi})$ are obtained at the respective representative points. In detail, the following process is carried out for all representative points. In this process, matching is made between the coordinate $(X_0, Y_0)$ of the main image memory and the coordinate $(0, 0)$ of the input image, corresponding to each other.

For pixels in a block $B_i$ including each representative point $(x_i, y_i)$ of the input image, the following calculation is carried out with all sets of $(v_x, v_y)$ in a preliminarily limited range.

Equation 8
$$D_i(v_x, v_y) = \Sigma_{mn} |M(X_0 + x_i - v_x + m, Y_0 + y_i - v_y + n) - I(x_i + m, y_i + n)|$$

or $$D_i(v_x, v_y) = \Sigma_{mn} \{M(X_0 + x_i - v_x + m, Y_0 + y_i - v_y + n) - I(x_i + m, y_i + n)\}^2,$$

where the summation range is all pixels of M×N in the block $B_i$, and m and n are integers satisfying the following relations:

$$-(M/2) \leq m < (M/2);$$

$$-(N/2) \leq n < (N/2).$$

In above Equation 8, M (m, n) means a process to output a coordinate value (m, n) through a signal line 711 to the main image memory 28 and then to obtain a pixel value corresponding to the coordinate value in the main image memory 28 through a signal line 712. I (m, n) means a process to output the coordinate value (m, n) through the signal line 54 to the input image memory 23 and to obtain a pixel value corresponding thereto in the input image memory 23 through the signal line 55. $X_0$ and $Y_0$ mean a process to refer to the coordinate values recorded in the origin buffer 75. Also, $v_x$ and $v_y$ are integers.

A set $(v_x, v_y)$, which makes the value of $D_i(v_x, v_y)$ in the above equation smallest, is defined as a motion vector $(v_{xi}, v_{yi})$ at the representative point $(x_i, y_i)$.

It is usual in the above process that M×N=4×4, 8×8, 16×16, 32×32, or the like, and that ranges of $v_x$ and $v_y$ are defined in a block, that is, that $$-M \leq v_x \leq M \text{ and } -N \leq v_y \leq N.$$

Method 1-2: density gradient method

The second method is a method as generally called as the density gradient method, which is described in detail in the following Reference 11.

(Ref. 11) Fukinuke "Measurements of displacement amount and velocity of moving object with image signals", Data of Image engineering study group, IECEJ, IE 78-67 (1978).

When a motion vector at each representative point is obtained by the density gradient method as $$(v_{xi}, v_{yi}),$$

where $i=0$ to $(K-1)$, the vector detecting portion 71 executes the process to make the coordinate $(X_0, Y_0)$ of the main image memory correspondent to the coordinate $(0, 0)$ of the input image. That is, the process is carried out to make the following correspondence:

$$(i+X_0, j+Y_0)=(m, n)$$

using a reference point of the coordinate $(X_0, y_0)$ in the origin buffer, in the input image I (i, j) and in the main image M (m, n).

Either of the above processes is carried out for each representative point $(x_i, y_i)$ stored in the vector buffer 76, and the result $(v_{xi}, v_{yi})$ is recorded in a predetermined section of "motion vectors" in the vector buffer The following explains the coefficient calculating portion 72 of the parameter determining circuit 27. In the coefficient calculating portion 72, parameters $(p_a, p_b, p_c, p_d, p_e, p_f)$ are calculated by either of the following processes from the motion vector $(v_{xi}, v_{yi})$ for each representative point $(x_i, y_i)$ recorded in the vector buffer 76 as a result of the above process by the vector detecting portion 71.

Method 1-3: least squares method

The parameters may be obtained by putting the equations for affine transformation, that is, $$x'=p_a \cdot x + p_b \cdot y + p_c;$$

$$y'=p_d \cdot x + p_e \cdot y + p_f,$$

into the motion vector $(v_{xi}, v_{yi})$ at each representative point $(x_i, y_i)$.

Equation 9

$$v_{xi}=x'_i-x_i=(p_a-1) \cdot x_i+p_b \cdot y_i+p_c;$$

$$v_{yi}=y'_i-y_i=p_d \cdot x_i+(p_e-1) \cdot y_i+p_f,$$

where $i=0$ to $(K-1)$.

The transformation parameters $(p_a, p_b, \ldots, p_f)$ are calculated from 2K equations in Equation 9 by the least squares method.

This method is a technique as described in the following Reference 12.

(Ref. 12) Tanaka, Yagi, and Enami "A study of motion vector detecting method of an object changing in amplitude and direction", Briefs 1989 Spring Nat. Conf., IECEJ, pp 7-91.

Method 1-4: method by partial differential equations

Above Equation 9 may be rewritten as follows while explicitly writing the errors.

Equation 10

$$\delta_{xi}=(p_a-1) \cdot x_i+p_b \cdot y_i+p_c-v_{xi};$$

$$\delta y_{yi}=p_d \cdot x_i+(p_e-1) \cdot y_i+p_f-v_{yi},$$

where i=0 to (K−1).

In the respective equations $\delta_{xi}$ and $\delta_{yi}$ are errors.

There are 2K equations obtained.

The following Equation 11 shows square sums of the errors as shown in above Equation 10.

$$i\Sigma\ (\delta_{xi})^2 \text{ and } i\Sigma\ (\delta_{yi})^2 \qquad \text{Equation 11}$$

Parameters $(p_a, p_b, p_c, p_d, p_e, p_f)$ to minimize the square sums of the errors may be obtained by solving the following simultaneous equations obtained by partial differentiation of the square sums of the errors with respect to the respective parameters.

$$\frac{\partial}{\partial P_a}\sum_i(\delta_{xi})^2=0\ \frac{\partial}{\partial P_b}\sum_i(\delta_{xi})^2=0\ \frac{\partial}{\partial P_c}\sum_i(\delta_{xi})^2=0 \qquad \text{Equation 12}$$

$$\frac{\partial}{\partial P_d}\sum_i(\delta_{yi})^2=0\ \frac{\partial}{\partial P_e}\sum_i(\delta_{yi})^2=0\ \frac{\partial}{\partial P_f}\sum_i(\delta_{yi})^2=0$$

In other words, the parameters $(p_a, p_b, p_c, p_d, p_e, p_f)$ may be obtained by the following calculations.

From  Equation 13

$$\bar{x}=\frac{1}{K}\Sigma x_i,\ \bar{y}=\frac{1}{K}\Sigma y_i,\ \overline{x^2}=\frac{1}{K}\Sigma(x_i)^2,\ \overline{y^2}=\frac{1}{K}\Sigma(y_i)^2,$$

$$\overline{x\cdot y}=\frac{1}{K}\Sigma x_i\cdot y_i,\ \overline{v_x}=\frac{1}{K}\Sigma v_{xi},\ \overline{v_y}=\frac{1}{K}\Sigma v_{yi},$$

$$\overline{x\cdot v_x}=\frac{1}{K}\Sigma x_i\cdot v_{xi},\ \overline{x\cdot v_y}=\frac{1}{K}\Sigma x_i\cdot v_{yi},$$

$$\overline{y\cdot v_x}=\frac{1}{K}\Sigma y_i\cdot v_{xi},\ \overline{x\cdot v_x}=\frac{1}{K}\Sigma x_i\cdot v_{xi},$$

calculating:

$$A=\overline{x^2}-\bar{x}\cdot\bar{x},\ B=\overline{y^2}-\bar{y}\cdot\bar{y},\ C=\overline{x\cdot y}-\bar{x}\cdot\bar{y},$$

$$D=\bar{x}\cdot\overline{v_x}-\overline{x\cdot v_x},\ E=\bar{x}\cdot\overline{v_y}-\overline{x\cdot v_y},$$

$$F=\bar{y}\cdot\overline{v_x}-\overline{y\cdot v_x},\ G=\bar{y}\cdot\overline{v_y}-\overline{y\cdot v_y},$$

$$\alpha=A\cdot B-C^2;$$

the parameters are obtained as follows:

$$p_a=\frac{C\cdot F-B\cdot D}{\alpha}+1,\ p_b=\frac{C\cdot D-A\cdot F}{\alpha},$$

$$p_c=\overline{v_x}-(p_a-1)\cdot\bar{x}-p_b\cdot\bar{y},$$

$$p_d=\frac{C\cdot G-B\cdot F}{\alpha},\ p_e=\frac{C\cdot E-A\cdot G}{\alpha}+1,$$

$$p_f=\overline{v_x}-p_d\cdot\bar{x}-(p_e-1)\cdot\bar{y}.$$

In the above equation, the summation range is i=0 to (K−1).

Also, $x_i$, $y_i$, $v_{xi}$ and $v_{yi}$ represent processes to read coordinates and motion vectors of the i-th representative point from the vector buffer 76, respectively.

$$\bar{x},\bar{y},\overline{x^2},\overline{y^2},\overline{x\cdot y},\overline{v_x},\overline{v_y},\overline{x\cdot v_x},\overline{x\cdot v_y},\overline{y\cdot v_x},\overline{x\cdot v_x} \qquad \text{Equation 14}$$

Above Equation 14 and A, B, C, D, E, F, G, $\alpha$, $p_a$, $p_b$, $p_c$, $p_d$, $p_e$, $p_f$, are floating-point type variable buffers in the vector detecting portion 71, and a=b represents a writing process in which the right side value b is written into the left side buffer a. The calculation is carried out in floating-point accuracy.

The coefficient calculating portion 72 outputs the parameters $(p_a, p_b, p_c, p_d, p_e, p_f)$ obtained by the above calculation process to the parameter dividing portion 73.

The parameter dividing portion 73 is next explained. The parameter dividing portion 73 divides the parameters $(p_a, p_b, p_c, p_d, p_e, p_f)$ input from the coefficient calculating portion 72 into parameters to be output to the main image correcting circuit 26 and to the input image correcting circuit 25, that is, into parallel displacement components of integral pixel unit and affine transformation components, and changes the contents of the origin buffer 75 with necessity.

In detail, the parameter dividing portion 73 executes the following process.

(1) Calculated are coordinates of four corners of the input image after transformation on the main memory. In other words, the following calculations are carried out:

$$X_{i0}=p_a\cdot X_0+p_b\cdot Y_0+p_c;$$

$$Y_{i0}=p_d\cdot X_0+p_e\cdot Y_0+p_f;$$

$$X_{i1}=p_a\cdot(X_0+XI-1)+p_b\cdot Y_0+p_c;$$

$$Y_{i1}=p_d\cdot(X_0+XI-1)+p_e\cdot Y_0+p_f;$$

$$X_{i2}=p_a\cdot(X_0+XI-1)+p_b\cdot(Y_0+YI-1)+p_c;$$

$$Y_{i2}=p_d\cdot(X_0+XI-1)+p_e\cdot(Y_0+YI-1)+p_f;$$

$$X_{i3}=p_a\cdot X_0+p_b\cdot(Y_0+YI-1)+p_c;$$

$$Y_{i3}=p_d\cdot X_0+p_e\cdot(Y_0+YI-1)+p_f,$$

where $X_{i0}$, $Y_{i0}$, $X_{i1}$, $Y_{i1}$, $X_{i2}$, $Y_{i2}$, $X_{i3}$, $Y_{i3}$ are floating-point type variable buffers in the parameter dividing portion 73, and "a=b" represents a writing process in which the right side value b is written into the left side buffer a;

$X_0$ and $Y_0$ represent reading processes to read a coordinate of current origin out of the origin buffer 75; and XI and YI are constants to show the numbers of pixels in the X- and the Y-directions of the input image.

(2) It is judged whether the coordinate values of four corners after transformation are located inside a rectangular region $(M_{x0}, M_{y0})-(M_{x2}, M_{y2})$ preliminarily set in the main image memory 28. That is, the following process is carried out:

$$D_{x0}=X_{i0}-M_{x0},\ D_{x1}=X_{i1}-M_{x1},$$

$$D_{x3}=X_{i3}-M_{x0},\ D_{x2}=X_{i2}-M_{x1},$$

$$D_{y0}=Y_{i0}-M_{y0},\ D_{y1}=Y_{i1}-M_{y1},$$

$$D_{y3}=Y_{i3}-M_{y0},\ D_{y2}=Y_{i2}-M_{y1},$$

where $D_{x0}$, $D_{x1}$, $D_{x3}$, $D_{x2}$, $D_{y0}$, $D_{y1}$, $D_{y3}$, $D_{y2}$ are floating-point type variable buffers in the parameter dividing portion 73, and "a=b" represents a writing process in which the right side value b is written into the left side buffer a;

$M_{x0}$, $M_{y0}$, $M_{x1}$, $M_{y1}$ are integral constants satisfying $0 \leq M_{x0} < M_{x1} < XM$, and $0 \leq M_{y0} < M_{y1} < YM$, which are coordinate values to make the input image after transformation included in the coordinate ranges in the main image memory:

$X_{i0}$, $Y_{i0}$, $X_{i1}$, $Y_{i1}$, $X_{i2}$, $Y_{i2}$, $X_{i3}$, $Y_{i3}$ represent reading processes to read recorded numerical values from the above buffers.

(3) Parameters ($p_{00}$, $p_{10}$, ..., $p_{21}$), ($q_x$, $q_y$), and origin coordinate ($X_0$, $Y_0$) for next process are calculated by the following process as the input image after transformation is made within the above ranges in the main image memory.

[1] Respective variables are set as follows;

$X_0=D_{x0}$, $Y_0=D_{y0}$, $p_{00}=p_a$, $p_{10}=p_b$, $p_{20}=p_c+D_{x0}$, $p_{01}=p_d$, $p_{11}=p_e$, $p_{21}=p_f+D_{y0}$, $q_x$ 0, $q_y=0$.

[2] A part of variables are rewritten with necessity as follows.

[2-1] In case that $D_{x0}<0$ or $D_{x3}<0$:

$X_0=M_{x0}$;

If $D_{x0}<D_{x3}$, $q_x=int(D_{x0})$;

If $D_{x3} \leq D_{x0}$, $q_x=int(D_{x3})$;

$p_{20}=p_c-q_x$.

[2-2] In case that $D_{y0}<0$ or $D_{y3}<0$:

$Y_0=M_{y0}$;

If $D_{y0}<D_{y3}$, $q_y=int(Dy_0)$;
If $D_{y3} \leq D_{y0}$, $q_y=int(D_{y3})$;

$p_{21}=p_f-q_y$.

[2-3] In case that $D_{x1}>0$ or $D_{x2}>0$:

If $D_{x1}<D_{x2}$, $q_x=-\{int(D_{x1})+1\}$;

If $D_{x2} \leq D_{x1}$, $q_x=-\{int(D_{x2})+1\}$;

$X_0=X_{i0}+q_x$;

$p_{20}=p_c+q_x$.

[2-4] In case that $D_{y1}>0$ or $D_{y2}>0$:

If $D_{y1}<D_{y2}$, $q_y=-\{int(D_{y1})+1\}$;

If $D_{y2}<D_{y1}$, $q_y=-\{int(D_{y2})+1\}$;

$Y_0=Y_{i0}+q_y$;

$p_{20}=p_f+q_y$.

In the above equations, $X_0$, $Y_0$, $p_{00}$, $p_{10}$, $p_{20}$, $p_{01}$, $p_{11}$, $p_{21}$, $q_x$, $q_y$ are variable buffers in the parameter dividing portion 73, in which $X_0$, $Y_0$, $q_x$, $q_y$ are those of real number type and others are of floating-point type. Further, "a=b" represents a writing process in which the right side value b is written into the left side buffer a.

Out of the parameters calculated by the above process, $x_0$ and $y_0$ are written in the origin buffer 75 to update the prior values. The parameters $p_{00}$, $p_{10}$, $p_{20}$, $p_{01}$, $p_{11}$, $p_{21}$ are output through the signal line 53 to the input image correcting circuit 25. Further, parameters $q_x$ and $q_y$ are output through the signal lines 63 to the main image correcting circuit 26.

The vector detecting portion 71, the coefficient calculating portion 72, and the parameter dividing portion 73 carry out the above process in a period between a timing when the frame switch signal generated by the synchronizing means 20 is turned into active and a timing when the pixel switch signal is turned into active.

However, the vector detecting portion 71 and the coefficient calculating portion 72 do not execute the process while the reset signal generated from the synchronizing means 20 is in active, but only the parameter dividing portion 73 carries out the following process.

In detail, the parameter dividing portion 78 outputs $p_{00}=0$, $p_{10}=0$, $p_{20}=D_x$, $p_{10}=0$, $p_{11}=0$, $p_{21}=D_y$ to the input image correcting circuit 25, and $q_x=0$, $q_y=0$ to the main image correcting circuit 26.

If the parameters ($p_a$, $p_b$, $p_c$, $p_d$, $p_e$, $p_f$) could be determined by a method other than the affine transformation parameter calculation method as described above, the other method is to be carried out in the period between the timing when the frame switch signal is turned into active and a timing when the pixel switch signal is turned into active, whereby the parameter determining circuit 27 may be operated in the same manner as in the above method in the present embodiment.

Total description of the first embodiment

The following explains the construction of a wide range image in the main image memory by joining images (as will be referred to as frames) input time-serially by execution of the processes in the below-described order, using the respective circuits, which carry out the operations as described above.

All the processes are carried out in synchronism with the synchronizing signals output through the signal line 30 from the synchronizing means 20. There are the following three signals in the synchronizing signals.

(1) Reset signal

The reset signal is a pulse signal for resetting the system, and gives a rise by an operation of an operator and holds the active state for the 0-th frame.

(2) Frame switch signal

The frame switch signal is a pulse signal for showing a switch of frame to be processed, and gives a rise upon start of frame processing and holds the active state during execution of the processing in the frame.

(3) Pixel switch signal

The pixel switch signal is a pulse signal for showing a switch of pixel to be processed, and includes a pulse generated for each pixel.

FIG. 12 shows a relation among the respective signals in the synchronizing signal. In FIG. 12, the high level represents the active state. Responding to a rise of the reset signal, the frame switch signal is turned into active and the pixel switch signal will have pulses of XM×YM, which is the number of pixels in the main image memory 28. After the pulses of XM×YM are generated in the pixel switch signal, the frame switch signal is turned into non-active and again gives a rise for start of processing of a next frame.

The operations of the respective portions are below explained along the synchronizing signals. Period numbers in FIG. 12 correspond to respective period numbers as described below.

Period (1): The following process is carried out after the reset signal is turned into active and before the frame switch signal is turned into active.

[1] The main image memory 28 clears the entire contents of the memory. That is, all pixel values in the main image memory are rewritten into 0.

[2] The parameter determining circuit 27 sets the origin coordinate in the origin buffer to the initial value ($D_x$, $D_y$).

[3] The image inputting means 11 writes image data of one frame into the input image memory 23.

Period (2): The following process is carried out while the reset signal and the frame switch signal for the 0-th frame are in active and before the pixel switch signal for the first pixel is turned into active.

The parameter determining circuit 27 outputs the following parameters to the input image correcting circuit 25:

$(p_{00}, p_{10}, p_{20}, p_{01}, p_{11}, p_{21}) = (0, 0, D_x, 0, 0, D_y)$.

Also, the parameter determining circuit 27 outputs the following parameters to the main image correcting circuit 26:

$(q_x, q_y) = (0, 0)$.

These parameters are for writing an input image in the central portion of the main image memory 25 only by the parallel displacement without magnification, contraction, or rotation, as shown in FIG. 8.

Period (3): The image combining circuit 24 writes in the order of raster pixel values input through the input image correcting circuit 25 into the main image memory 28 every time when the pixel switch signal is turned into active while the reset signal is in active.

After the processes are carried out in the above "Period (1) to Period (3)", image data on the input image memory 23 is written into the central portion of the main image memory 28, as shown in FIG. 8.

After the reset signal is turned into non-active, the execution of the following process is repeated.

Period (4): The following process is carried out in a period between a timing when the frame switch signal is turned into non-active and a timing when the frame switch signal is again turned into active.

[1] The image inputting means 11 writes image data of next one frame into the input image memory 23.

[2] The main image correcting circuit 26 copies the contents of the main image memory 28 into the image buffer 61.

[3] The parameter determining circuit 27 selects representative points in the input image with necessity and writes coordinate values thereof into the vector buffer 76.

Period (5): The following process is carried out while the reset signal is in the non-active state and in a period between a timing when the frame switch signal is turned into active and a timing when the pixel switch signal is turned into active.

The parameter determining circuit 27 conducts the matching between the image of next frame recorded in the input image memory 23 and the image having been produced and recorded in the main image memory 28. The parameter determining circuit 27 calculates the parameters ($p_{00}$, $P_{10}$, $P_{20}$, $P_{01}$, $P_{11}$, $P_{21}$) and parameters ($q_x$, $q_y$), and outputs them to the input image correcting circuit 25 and to the main image correcting circuit 26. The parameter determining circuit 27 rewrites the contents of the origin buffer into a new origin coordinate if necessary.

Period (6): The image combining circuit 24 combines the pixel values input through the input image correcting circuit 25 and the main image input through the main image correcting circuit 26, and writes the combined image in the order of raster into the main image memory 28 while the reset signal is in non-active and every time when the pixel switch pulse is turned into active.

Figure 13:
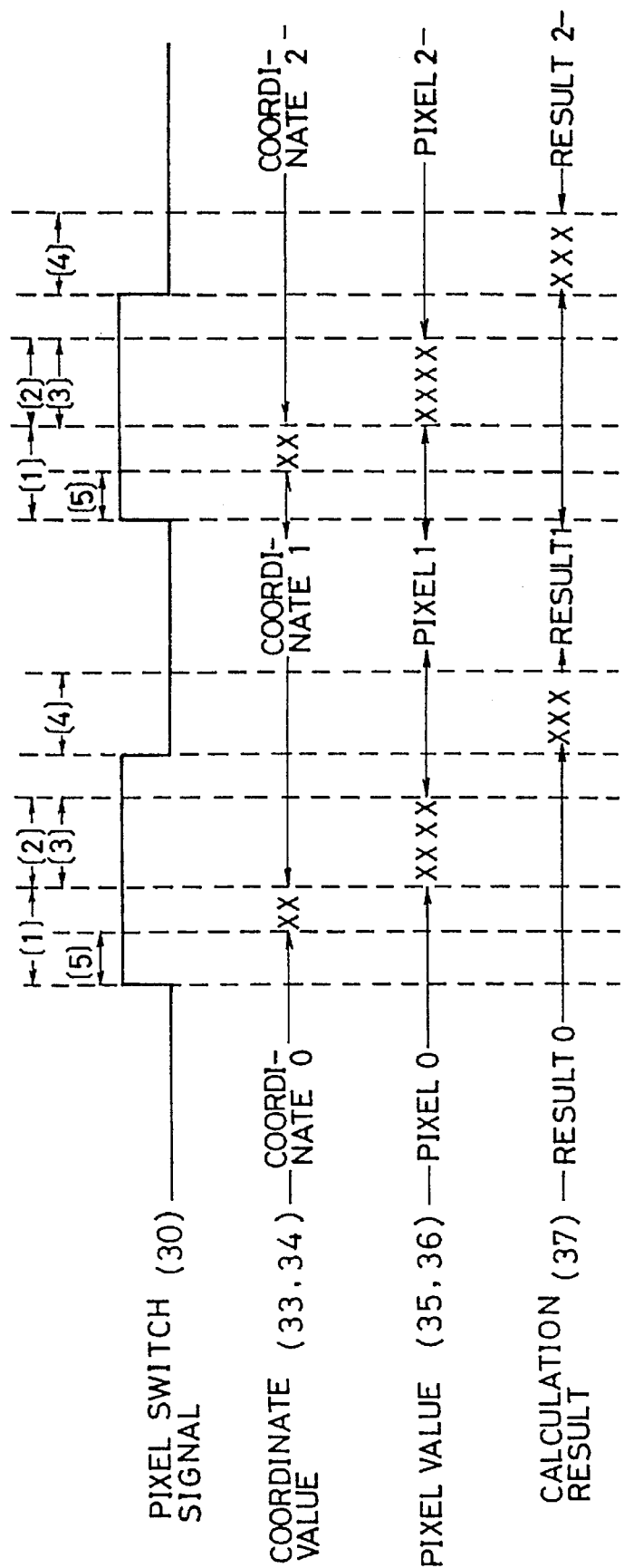
FIG. 13 is a drawing to illustrate a process for each pixel.

FIG. 13 is a time chart to show the process for each pixel. In FIG. 13, numbers at the left end are numerals given to the signal lines in the present embodiment in FIG. 3; —coordinate 1—, —pixel 1—, —result 1—, and so on represent the fact that a value is determined on each of the signal lines; and x represents the fact that the value is not determined yet on each of the signal lines.

Also in FIG. 13, [1], [2], and so on represent periods for carrying out the following processes.

[1] The image combining circuit 24 detects a leading edge of the pixel switch signal in the synchronizing signals 30 and outputs a coordinate value through the signal line 33 to the input image correcting circuit 25 and to the main image correcting circuit 26. Also, the image combining circuit 24 outputs the same coordinate value through the signal line 34 to the main image memory.

[2] The input image correcting circuit 25 calculates pixel data corresponding to a coordinate input through the signal line 33 from an image in the input image memory 23, based on the parameters input from the parameter determining circuit 27, and outputs the calculated data to the image combining circuit 24 before a fall of the pixel switch signal.

[3] The main image correcting circuit 26 corrects image data corresponding to the coordinate input through the signal line 33, based on the parameters input from the parameter determining circuit 27, and then outputs the corrected data to the image combining circuit 24 before the pixel switch signal starts falling.

After the above process of [1], [2], and [3], the coordinate value (33) and the pixel values (35, 36) are finally determined at the fall of the pixel switch signal.

[4] The image combining circuit 24 detects a fall of the image switch signal, executes a calculation process of pixel data input through the signal lines 35, 36 from the input image correcting circuit 25 and the main image correcting circuit 26, and outputs the calculation result through the signal line 37 to the main image memory 28 before a next rise of the pixel switch signal.

[5] As a result, the coordinate value (34) and the calculation result (37) are finally determined at the next rise of the pixel switch signal, and the main image memory writes the pixel value (37) for a pixel corresponding to the coordinate value (34) at the next rise of the pixel switch signal.

Figure 14:
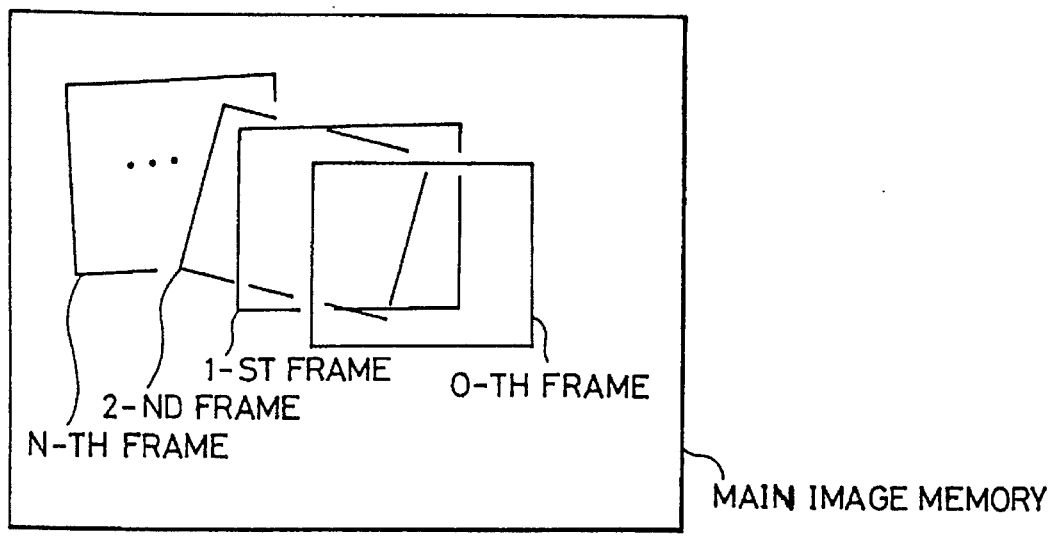
FIG. 14 is a drawing to exemplify a process result in the first embodiment.

After the above processes in "Period (4) to Period (6)", there is an image produced in the main image memory 28, as shown in FIG. 14, in which frames time-serially input from the image inputting means 11 are joined with one another such that the same regions in the frames are superimposed on one another.

Although the affine transformation is carried out in the input image correcting circuit 25 and the parallel displacement of one pixel unit is in the main image correcting circuit 26 in the present embodiment, the processes may be reversed such that the parallel displacement of one pixel unit is carried out in the input image correcting circuit 25 and the affine transformation is in the main image correcting circuit 26. Such an alternative arrangement is different from the present embodiment in the following respects.

(1) In the parameter determining circuit 27 representative points are taken in an image on the main image memory 28 and the matching is made with the input image.

(2) The parameter determining circuit outputs the parallel displacement components ($q_x$, $q_y$) to the input image correcting circuit and the affine transformation parameters ($p_{00}$, $P_{10}$, $P_{20}$, ..., $P_{21}$) to the main image correcting circuit.

(3) The input image correcting circuit has the same construction as the main image correcting circuit in the above embodiment, and outputs a result of parallel displacement of integer pixel unit effected on the image data of the input image memory, to the image combining circuit.

(4) The main image correcting circuit carries out the same processes as the input image correcting circuit in the above embodiment, that is, the affine transformation and the pixel interpolation processes effected on the entire image of the main image memory. The construction and the operation of the main image correcting circuit in this arrangement are the same as those of a main image correcting circuit 156 in the second embodiment as described below.

Second Embodiment

The second embodiment of the image processing apparatus according to the present invention is next explained with reference to the accompanying drawings. The second embodiment shows an example of the image processing apparatus which can obtain a high quality dynamic image by pixel enlargement interpolation, that is, which can produce an image having a greater pixel number than an input image through interpolation of pixels of serially input images, using image information of a frame having already been input.

Figure 15:
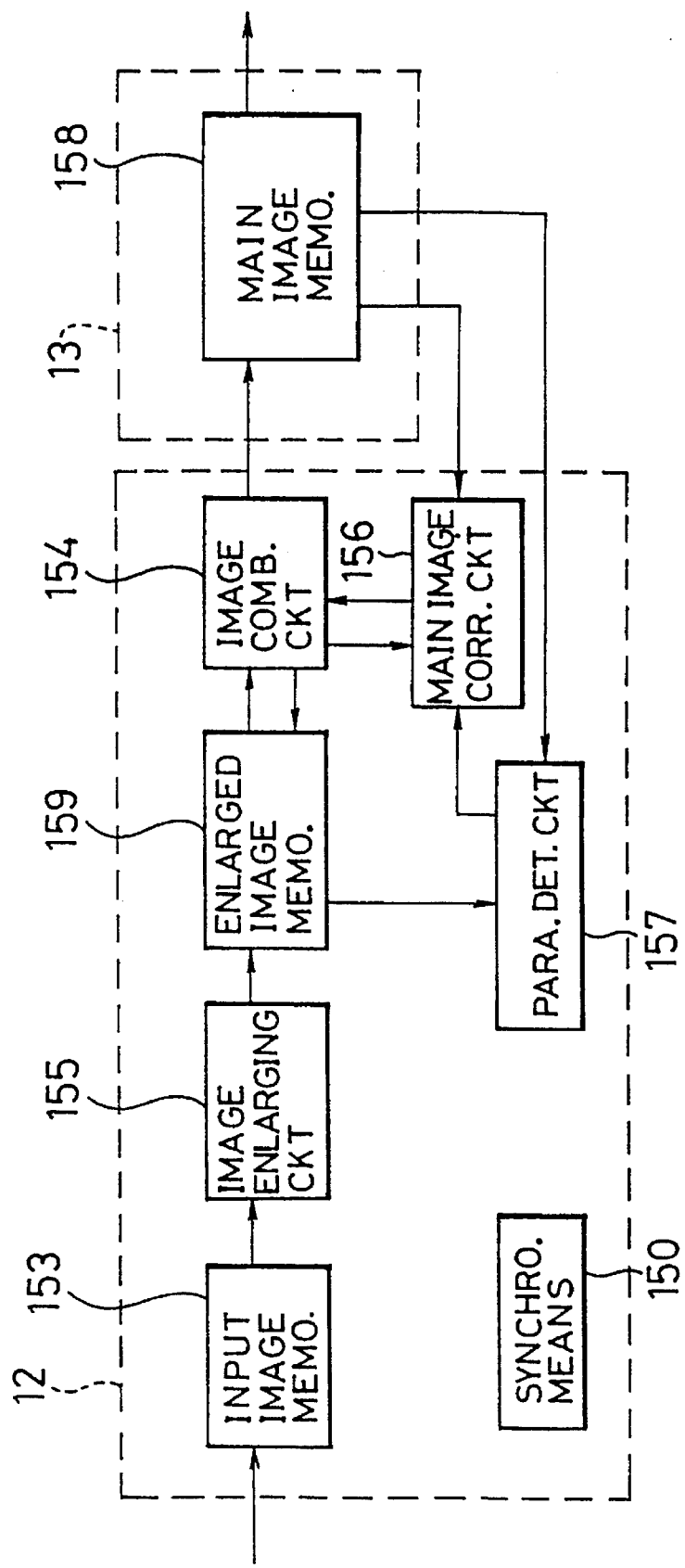
FIG. 15 is a constitutional drawing of the second embodiment.

FIG. 15 is a drawing to show an example of constitution of input processing means 12 and image storing means 13 in the second embodiment according to the present invention. In FIG. 15, synchronizing means 150, input image memory 153, and main image memory 158 are the same circuits with the same specifications and the same operations as the synchronizing means 20, the input image memory 23, and the main image memory 28, respectively, in the first embodiment except for the following respects.

The input processing means 12 comprises an input image memory 153, an image combining circuit 154, an image enlarging circuit 155, a main image correcting circuit 156, a parameter determining circuit 157, and an enlarged image memory 159. The input image memory 153 outputs a pixel value corresponding to a coordinate input from the image enlarging circuit 155.

The image combining circuit 154 outputs a coordinate value to the enlarged image memory 154 and to the main image correcting circuit 156, calculates pixel data obtained as a result of the output from the respective circuits, and outputs the coordinate value and a value of the calculation result to the main image memory 158. The details of the operation of the image combining circuit 154 will be described later.

The image enlarging circuit 155 comprises a digital calculating circuit, a semiconductor memory, and peripheral circuits, which executes an enlargement process of digital image data stored in the input image memory 153 up to the pixel number of the main image memory 158 to write it into the enlarged image memory 159. The details of the operation of the image enlarging circuit 155 will be described later.

The enlarged image memory 159 is a circuit for recording the input image enlarged by the image enlarging circuit, which comprises a semiconductor memory and peripheral circuits. The capacity of the enlarged image memory 159 is the same as that of the main image memory, specifically pixels of XM×YM in the present embodiment, each pixel storing lightness information of one of GM gradations.

For brevity of notation, a pixel value is described as $F_i(m, n)$ at a coordinate $(m, n)$ of the enlarged image memory. In the description, $0 \leq m < XM$, $0 \leq n < YM$, $0 \leq F_i(m, n) < GM$, and $m$, $n$, and $F_i(m, n)$ are integers.

The main image correcting circuit 158 comprises a digital calculating circuit, a semiconductor memory, and peripheral circuits, which transforms image data in the main image memory 28 with parameters input from the parameter determining circuit 157 and which outputs image data corresponding to the coordinate value input from the image combining circuit 154, to the image combining circuit 154. The details of the operation of the main image correcting circuit 156 will be described later.

The correction process in the main image correcting circuit 156 is described as a function $F_m$ for brevity of description in the present embodiment, by which a pixel value may be expressed as $F_m(k, l)$ at a coordinate $(k, l)$ after correction. In the description, $0 \leq k < XM$, $0 \leq l < YM$, $0 \leq F_m(k, l) < GM$ and $k$, $l$, and $F_m(k, l)$ are integers.

The parameter determining circuit 157 comprises a digital calculating circuit, a semiconductor memory, and peripheral circuits, which compares image data pieces respectively stored in the enlarged image memory 159 and in the main image memory 158 with each other to output correction parameters to the main image correcting circuit 156. The details of the operation of the parameter determining circuit 157 will be described later.

The image storing means 13 comprises a main image memory 158, and the main image memory 158 takes in a coordinate and a pixel value from the image combining circuit 154 and writes the pixel value in a memory region corresponding to the input coordinate. Also, the main image memory 158 outputs the pixel value corresponding to the input coordinate from the parameter determining circuit 157 or from the main image correcting circuit 156, to either of the circuits.

The operations of the image combining circuit 154, the image enlarging circuit 155, the main image correcting circuit 156, and the parameter determining circuit 157 are below described in more detail with FIG. 15.

The following explains the image combining circuit 154. The image combining circuit 154 has the same construction and function as the image combining circuit 24 as shown in FIG. 3 except for the following respects in construction.

(1) The image combining circuit 154 is connected to the enlarged image memory 159 while the image combining circuit 24 is connected to the input image correcting circuit 25.

(2) The image combining circuit 154 is connected to the main image correcting circuit 156 while the image combining circuit 24 is connected to the main image correcting circuit 26.

The coordinate generating portion sequentially generates all coordinate values present in the main image memory in the order of raster at each rise of the pixel switch pulse signal in the same manner as in the first embodiment.

The image calculating portion takes respective pixel values from the enlarged input memory 159 and from the main image correcting circuit 156 at a timing when the pixel switch signal is changed from active to non-active, executes the following calculation on each of the pixel values, and outputs the calculation result to the main image memory 158 before the pixel switch signal is again turned into active.

$$M = \alpha \times F_i + (1-\alpha) \times F_m;$$

If $M \geq GM$ then $M = GM$, where $\alpha$ is a constant preliminarily determined as $0 < \alpha < 1$, M is a pixel value output to the main image memory 158, $F_i$ is a pixel value input from the enlarged image memory 159, and $F_m$ is a pixel value input from the main image correcting circuit 156.

In the condition that the reset signal is in active, the following calculation, that is, a writing process in which only the input from the enlarged image memory 159 is written into the main image memory 158, is carried out:

$$M = F_i;$$

If $M \geq GM$ then $M = GM$.

Figure 16:
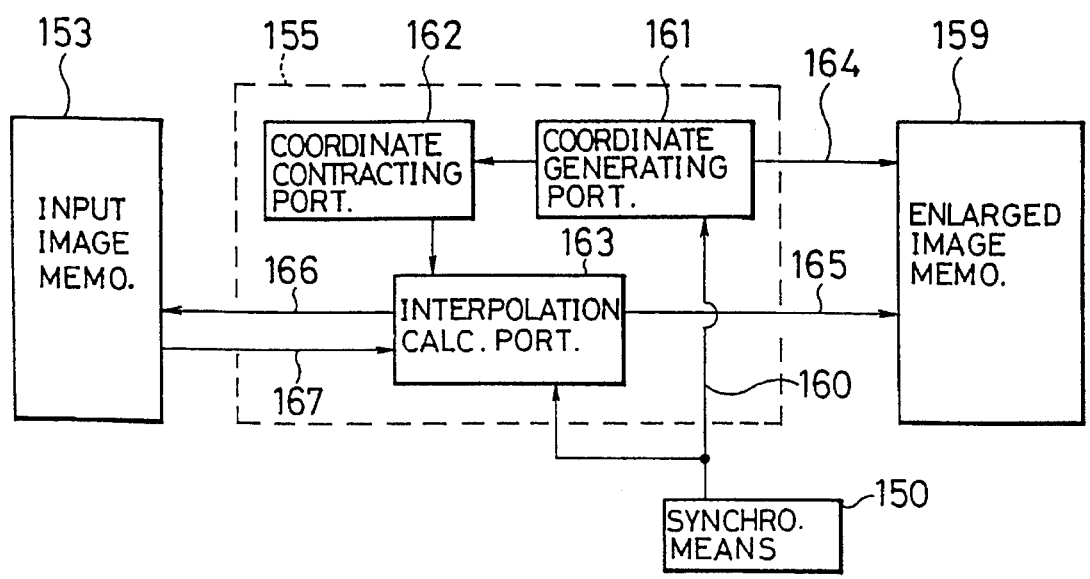
FIG. 16 is a constitutional drawing of an image enlarging circuit in the second embodiment.

The following explains the image enlarging circuit 155. The image enlarging circuit 155 carries out a process for enlarging the image data with (XI, YI) pixels in the input image memory into one with pixel number (XM, YM) of the main image memory, which comprises a coordinate generating portion 161, a coordinate contracting portion 162, and an interpolation calculating portion 163, as shown in FIG. 16.

The coordinate generating portion 161 generates all pixel coordinates in the enlarged image memory in the order of raster to sequentially output them to the coordinate contracting portion 162 and to output them through a signal line 164 to the enlarged image memory 159 while the frame switch signal is in the non-active and in a period between a timing when next frame image is input to input image memory and a timing when the frame switch signal is again turned into active.

The coordinate contracting portion 162 executes the following process on each of the coordinate values input from the coordinate generating portion 161 to output result values to the interpolation calculating portion 163:

$$(x', y')=(a \cdot x, b \cdot y),$$

where a and b are floating-point type constants showing rates of enlargement, which are calculated by the following equations:

$$a=XI/IM;$$

$$b=YI/YM,$$

where x and y are integer coordinate values input from the coordinate generating portion 161, and x' and y' are floating-point type coordinate values output to the interpolation calculating portion 163.

The interpolation calculating portion 163 executes the following process, which is similar to that executed by the interpolation calculating portion 52 in the first embodiment, for each of the coordinate values input from the coordinate contracting portion 162:

$$M_i=F(x', y'),$$

where (x', y') is a coordinate input from the coordinate contracting portion 162, $M_i$ is a calculation result output through a signal line 165 to the enlarged image memory 18g, and F(x', y') means calculation of image data of the input image memory 153 with the coordinate value (x', y') by using either method of the "cubic interpolation method", the "bilinear interpolation method", and the "nearest proximity method" as described in the first embodiment.

A signal line 166 in FIG. 16 is for outputting a coordinate value of necessary pixel to the input image memory 153 upon the above calculation, and a signal line 168 is for inputting a pixel value for the coordinate value output through the signal line 166.

After the above process in the image enlarging circuit 155, an enlarged image, which is enlarged from an image of the input image memory into one having the same pixel number as the main image memory, is produced in the enlarged image memory 159 in a period between a timing when the frame switch signal is turned into non-active and a timing when the frame switch signal is again turned into active.

Figure 17:
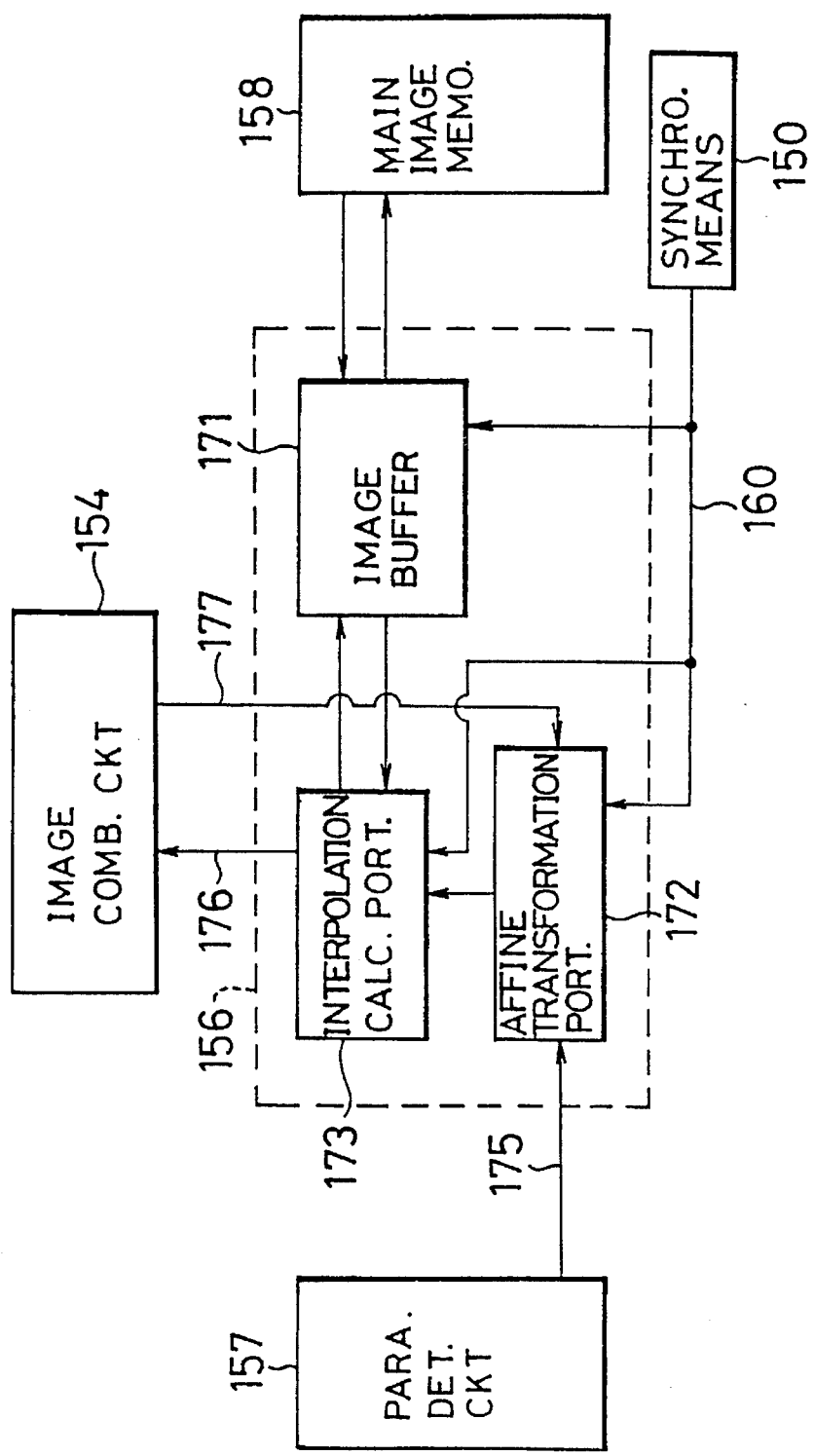
FIG. 17 is a constitutional drawing of a main image correcting circuit in the second embodiment.

The following explains the main image correcting circuit 156. The main image correcting circuit 156 comprises an image buffer 171, an affine transformation portion 152, and an interpolation calculating portion 173, as shown in FIG. 17, which carries out the same affine transformation of main image as the input image correcting circuit 25 in the first embodiment.

The image buffer 171 is an image memory with the same capacity as the main image memory 158, which copies the entire contents of the main image memory in a period between a timing when the frame switch signal in the synchronizing signal 160 is turned into non-active and a timing when the frame switch signal is again turned into active.

Additionally, the image buffer 171 outputs a value of pixel corresponding to a coordinate value input from the interpolation calculating portion 173, to the interpolation calculating portion 173.

The affine transformation portion 172 carries out the following process in the same manner as the affine transformation portion 51 in the first embodiment.

(1) Affine transformation coefficients are input through a signal line 175 from the parameter determining circuit 157 after the frame switch signal in the synchronizing signals 160 starts rising and before the pixel switch signal starts rising.

(2) A coordinate value input through a signal line 177 from the image combining circuit 154 every time when the pixel switch signal starts rising is transformed by the following Equation 15, and the transformed value is output to the interpolation calculating portion 173.

$$(x', y', 1) = (x, y, 1) \begin{bmatrix} p_a & p_d & 0 \\ p_b & p_e & 0 \\ p_c & p_f & 1 \end{bmatrix}, \quad \text{Equation 15}$$

where matrix elements $P_a$, $P_b$, $P_c$, $P_d$, $P_e$, $p_f$ are affine transformation coefficients input from the parameter determining circuit 157, (x, y) a coordinate value input from the image combining circuit 154, and (x', y') a coordinate value output to the interpolation calculating portion 173.

The interpolation calculating portion 173 carries out the following process in the same manner as the interpolation calculating portion 52 in the first embodiment.

(3) The coordinate value, which is a result of the above process, is input from the affine transformation portion 172.

(4) The interpolation calculating portion 173 executes the following pixel interpolation calculation process for the input coordinate value while the pixel switch signal is in active, and outputs the thus-obtained result through a signal line 176 to the image combining circuit 154.

$$M_m=F(x', y'),$$

where (x', y') is a coordinate value input from the affine transformation portion 172, $M_m$ is a calculation result output through the signal line 176 to the enlarged image memory 154 in the image combining circuit, and F(x', y') means the calculation effected on image data of the image buffer 171 with the coordinate value (x', y') by using either method of the "cubic interpolation method", the "bilinear interpolation method", and the "nearest proximity method" as described in the first embodiment.

In the above process, the main image correcting circuit 156 executes the affine transformation of the image data of the main image memory 158 with parameters from the parameter determining circuit 157, and outputs the transformed data to the image combining circuit 154. But the main image correcting circuit 156 does not execute the above process in the condition that the reset signal generated from the synchronizing means 150 is in active.

Figure 18:
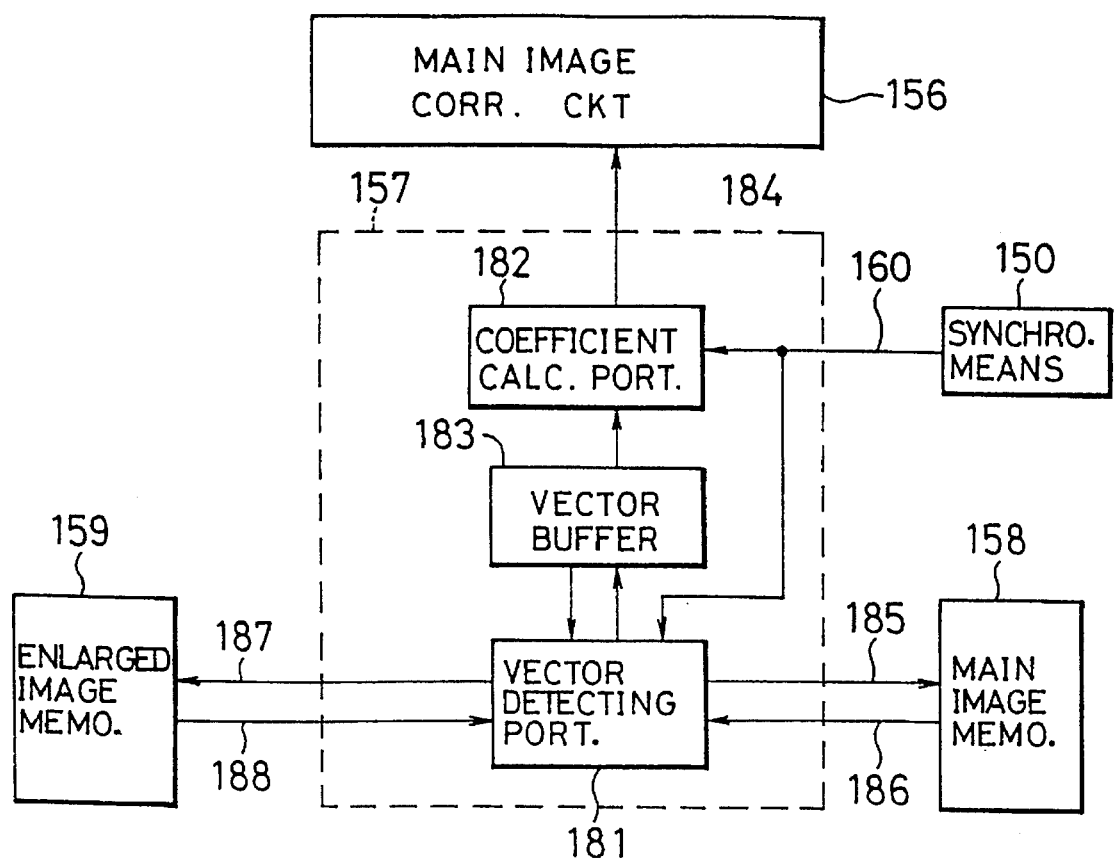
FIG. 18 is a constitutional drawing of a parameter determining circuit in the second embodiment.

The following explains the parameter determining circuit 157. The parameter determining circuit 157 comprises a vector detecting portion 181, a coefficient calculating portion 182, and a vector buffer 183, as shown in FIG. 18, which carries out the process in synchronism with the synchronizing signals 160 from the synchronizing means 150.

The vector buffer 183 is temporary memory means for storing coordinate values of K representative points and motion vector values at the respective representative points in the form of table as shown in FIG. 30, which comprises a semiconductor memory and peripheral circuits. The vector detection portion 181 writes in and reads out of the vector buffer 183 and the coefficient calculating portion 182 reads data out of the vector buffer 183.

The vector detecting portion 181 compares image data in the main image memory 158 with image data in the enlarged image memory 159 to obtain motion vectors at a plurality of representative points set in the main image.

The following explains a representative point determining portion. In the present embodiment, there are K representative points taken in the main image, and a coordinate of a representative point is defined as follows:

$(x_i, y_i)$, where i=0 to (K−1),
$0 \leq x_i < XI$, and $0 \leq y_i < YI$.

The method for determining the coordinates of the representative points is the same as one carried out by the vector detecting portion 71 in the first embodiment, which is either of the following processes.

(1) The representative points are preliminarily determined independent of an object image, and coordinate values thereof are written in a section of "representative point coordinates" in the vector buffer 183.

(2) Coordinates of representative points are determined from an image of the main image memory by the same method as in the first embodiment while the frame switch signal is in non-active, and the determined coordinates are written in the vector buffer when they are determined.

But neither of the above processes is carried out while the reset signal is in active.

The following explains the vector calculating portion. The vector calculating portion obtains corresponding points of image in an enlarged image to the respective representative points $(x_i, y_i)$ in the main image obtained in the above process:

$(x'_i, y'_i)$, where i=0 to (K−1);
or motion vectors:

$(v_{xi}, v_{yi}) = (x'_i - x_i, y'_i - y_i)$, where i=0 to (K−1);
by the block matching or the density gradient method in the same manner as in the first embodiment, and writes the result in a section of "motion vectors" in the vector buffer 183.

A difference from the first embodiment is as follows: In the first embodiment, as shown in FIG. 11, the origin (left upper corner) of the input image is made correspondent with the coordinate $(x_0, y_0)$ of the main image and motion vectors are detected at respective representative points, while in the present embodiment the origin of the enlarged image is always made correspondent with the origin of the main image for calculation of the motion vectors, because the enlarged image has the same pixels as the main image.

The following explains the coefficient calculating portion 182. The coefficient calculating portion 182 calculates the parameters $(P_a, P_b, P_c, P_d, P_e, P_f)$ from the motion vectors $(v_{xi}, v_{yi})$ for the respective representative points $(x_i, y_i)$, which are recorded in the vector buffer 183 as the result of the above process executed by the vector detecting portion 181, by either process of the least squares method and the method using the partial differential equations as described in the first embodiment, and outputs the parameters through a signal line 184 to the main image correcting circuit 156.

The vector detecting portion 181 and the coefficient calculating portion 182 execute the above processes in a period between a timing when the frame switch signal generated from the synchronizing means 150 is turned into active and a timing when the pixel switch signal is turned into active.

However, the parameter determining circuit 157 does not execute the process while the reset signal generated from the synchronizing means 150 is in active.

Total description of the second embodiment

The following explains how an image of higher resolution is constructed in the main image memory than that of the input image by enlarging and combining images (frames) time-serially input through by the processes executed in the following order, using the respective circuits to conduct the above-described operations.

All the processes are carried out in synchronism with the synchronizing signals output through the signal line 160 from the synchronizing means 150. The synchronizing signals include three types of signals as described below similarly as in FIG. 12 in the first embodiment.

(1) Reset signal;

(2) Frame switch signal; and (3) Pixel switch signal.

The operations of the respective portions are explained along the synchronizing signals as shown in FIG. 12.

Period (1): The following process is carried out after the reset signal is turned into active and before the frame switch signal is turned into active.

[1] The main image memory 158 clears the entire contents of the memory. That is, all pixel values in the main image memory is rewritten into 0.

[2] The image inputting means 11 writes image data of one frame into the input image memory 153.

[3] The image enlarging circuit 155 enlarges and interpolates the image written in the input image memory 153 in the process of above [2] to write the result in the enlarged image memory 159.

Period (2): No process is carried out while the reset signal and the frame switch signal for a first frame are in active and before the pixel switch signal for the first pixel is turned into active.

Period (3): The image combining circuit 154 writes the image recorded in the enlarged image memory 159 in the order of raster into the main image memory 158 every time when the pixel switch pulse is turned into active while the reset signal is in active.

After the above processes in "Period (1) to Period (3)", the input image is enlarged into an image having the same pixel number as the main image memory 158, and the enlarged image is written in the main image memory 158.

Execution of the following process is repeated after the reset signal is turned into non-active.

Period (4): The following processes are carried out in a period between a timing when the frame switch signal is turned into non-active and a timing when the frame switch signal is again turned into active.

[1] The image inputting means 11 writes image data of next one frame in the input image memory 153.

[2] The image enlarging circuit 155 executes the enlargement interpolation process of the image recorded in the input image memory 153 to write the processed image in the enlarged image memory 159.

[3] The main image correcting circuit 156 copies the contents of the main image memory into the image buffer 171.

[4] The parameter determining circuit 157 selects representative points from the main image if necessary, and writes coordinate values thereof in the vector buffer 183.

Period (5): The following process is carried out while the reset signal is in the non-active state and in a period between a timing when the frame switch signal is turned into active and a timing when the pixel switch signal is turned into active.

The parameter determining circuit 157 executes matching between the enlarged image of next frame recorded in the enlarged image memory 159 and the image having been produced and recorded in the main image memory 158, calculates the parameters ($P_a$, $P_b$, $P_c$, $P_d$, $P_e$, $P_f$), and outputs them to the main image correcting circuit 156.

Period (6): The image combining circuit 154 combines the image in the enlarged image memory 159 and the main image input through the main image correcting circuit 156 every time when the pixel switch pulse is turned into active while the reset signal is in non-active, and writes the combined image in the order of raster in the main image memory 158.

Figure 19:
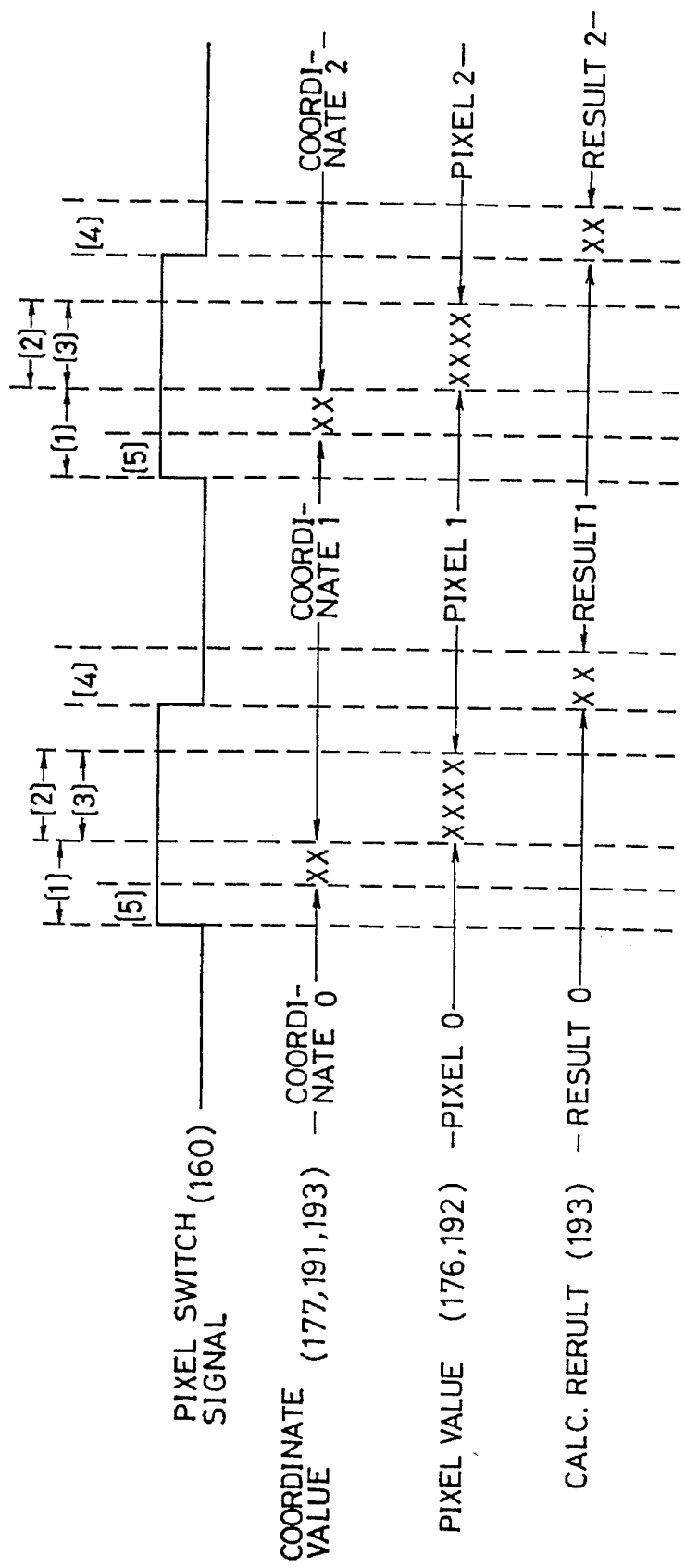
FIG. 19 is a drawing to illustrate a process for each pixel in the second embodiment.

FIG. 19 is a time chart to show the processes for each of these images. In FIG. 19, numbers at the left end represent signal lines for transmitting the following signals.

160: Pixel switch pulse signal in the synchronizing signals 160 output from the synchronizing means 150.

177: Coordinate value output from the image combining circuit 154 to the main image correcting circuit 156.

191: Coordinate value output from the image combining circuit 154 to the enlarged image memory 159.

176: Pixel value output from the main image correcting circuit 156 to the image combining circuit 154.

192: Pixel value output from the enlarged image memory 159 to the image combining circuit 154.

193: Coordinate value and pixel value output from the image combining circuit 154 to the main image memory 158.

Further in FIG. 19, —coordinate 1—, —pixel 1—, —result 1—, and so on represent the fact that the value is determined on each of the signal lines, and x represents the fact that the value is not determined yet on each of the signal lines. [1], [2], and so on in FIG. 19 show periods to carry out the following processes.

[1] The image combining circuit 154 detects a rise of the pixel switch signal in the synchronizing signals 160, and outputs a coordinate value through signal lines 177, 191 to the main image correcting circuit 156 and to the enlarged image memory 159. The same coordinate value is output through a signal line 193 to the main image memory.

[2] The enlarged image memory 159 outputs pixel data corresponding to the coordinate input through the signal line 191, through the signal line 192 to the image combining circuit 154 before a fall of the pixel switch signal.

[3] The main image correcting circuit 156 calculates pixel data corresponding to the coordinate input through the signal line 177 from the image data of the image buffer 171, based on the parameters input from the parameter determining circuit 157, and outputs the pixel data through the signal line 176 to the image combining circuit 154 before a fall of the pixel switch signal.

After the above processes [1], [2], and [3], the coordinate values (177, 192, 193) and pixel values (176, 192) are finally determined at the fall of the pixel switch signal.

[4] The image combining circuit 154 detects a fall of the pixel switch signal, executes the calculation process of the pixel data input through the signal lines 192, 176 from the input image memory 159 and from the main image correcting circuit 156, and outputs the calculation result through the signal line 193 to the main image memory 158 before a rise of next synchronizing signal.

[5] As a result, the coordinate value and the calculation result are finally determined on the signal line 193 at a rise of the pixel switch signal, and the main image memory 158 writes the pixel value in a pixel corresponding to the coordinate value input from the image combining circuit 154 at the rise of the pixel switch signal.

Figure 20:
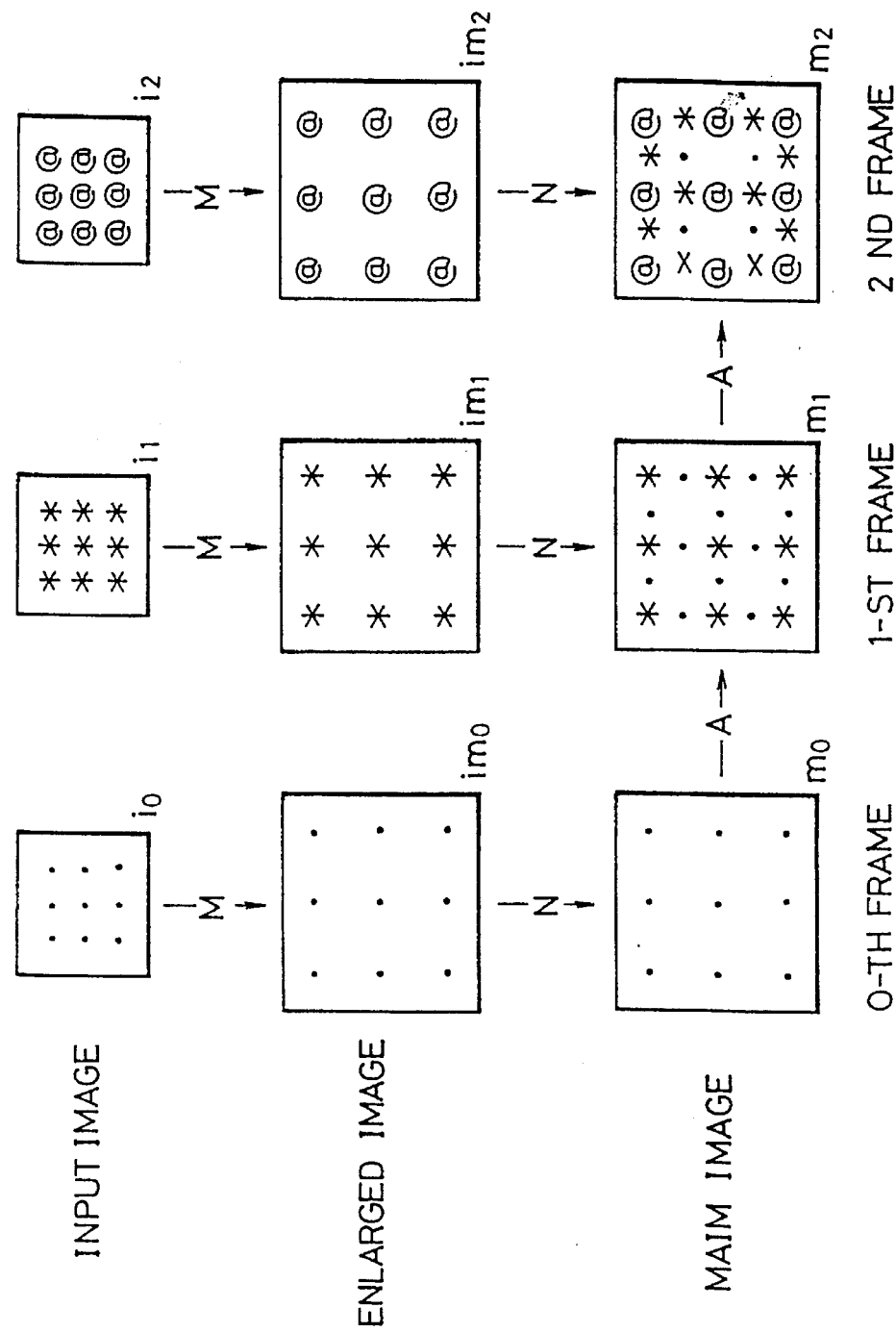
FIG. 20 is a drawing to schematically illustrate a process in the second embodiment.

By the above processes in "Period (4) to Period (6)", an image is produced in the main image memory 158, which is produced by interpolating and correcting the enlarged image of the last input frame among time-serially input frames from the image inputting means 11, with image information of frames having been input. FIG. 20 schematically shows the sequence of the processes.

In FIG. 20, A, N, and M respectively represent the transformation processes of coordinate, in which A shows the affine transformation, N no transformation, and M an enlargement process. Additionally, i0, i1, and i2 represent images input time-serially, im0, im1, and im2 images after enlargement process of the input images i0, i1, and i2, and m0, m1, and m2 images produced on the main image memory.

The process of the 0-th frame is carried out while the reset signal is in active, and the image im0 obtained by enlarging the input image i0 is recorded as the image m0 in the main image memory.

In the first frame, the image im1 obtained by enlarging the next input image i1 and the image m0 produced in the 0-th frame are combined to produce the image m1 on the main image memory, in which the image im1 is not subject to the coordinate transformation but the image m0 is subject to the coordinate transformation by the affine transformation to be matched with the image im1. Thus, the image m1 is produced by interpolating and correcting the image im1 with the image m0.

In the second frame, the image m2 is produced on the main image memory in the same manner as the image produced by the process of the first frame, which is obtained by interpolating and correcting the image im2 obtained by enlarging the next input image i2, with the image m1 produced in the first frame.

If the prior image information makes a contribution to the next image in these processes, a control may be made to change the constant $\alpha$ in the process in the image combining circuit 154.

Third Embodiment

Figure 21:
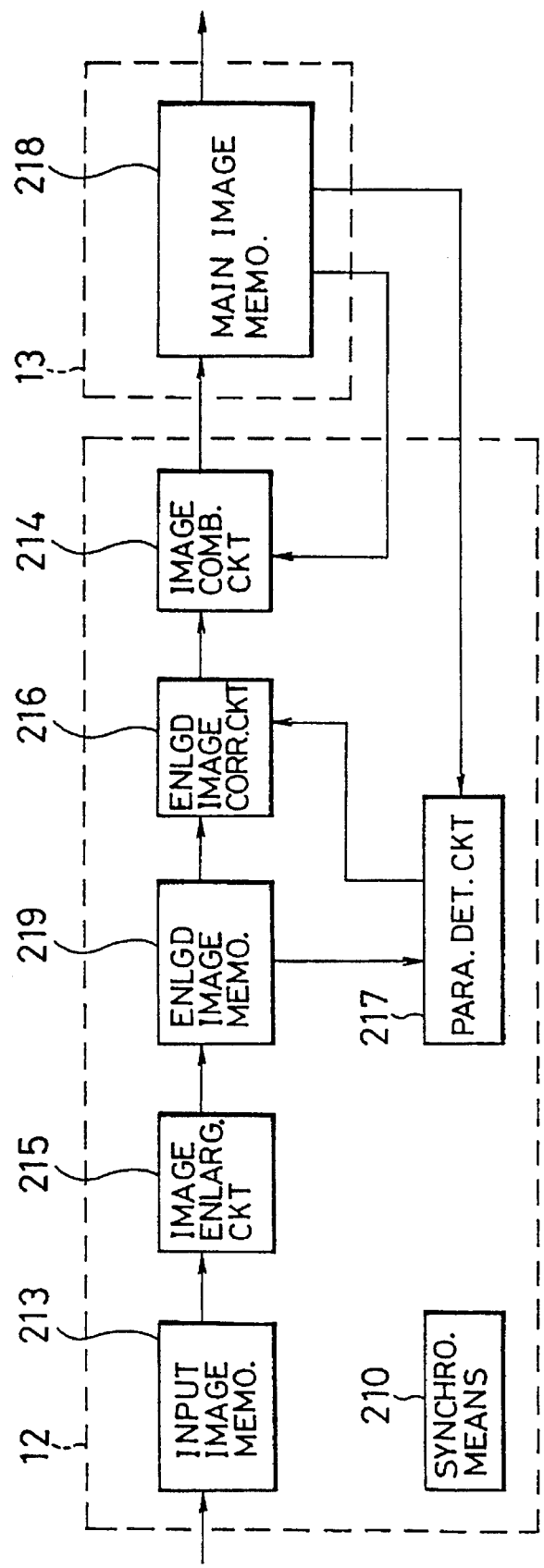
FIG. 21 is a constitutional drawing of the third embodiment.

In the second embodiment as described, the image of the main image memory 158 is combined with the major image of the enlarged image memory 159 thereby to effect the correction and interpolation of the latest input image with the images having already been input. However, an alternative arrangement as shown in FIG. 21 may be employed, in which the first input image (upon reset of the system) is interpolated and corrected by combining the enlarged image about the main image. An image processing apparatus enabling such input image correction is described in the following as the third embodiment.

In FIG. 21, synchronizing means 210, an input image memory 213, an image enlarging circuit 215, an enlarged image memory 219, an image combining circuit 214, an enlarged image correcting circuit 216, a parameter determining circuit 217, and a main image memory 218 are the same circuits with the same specifications and operations as the synchronizing means 15, the input image memory 153, the image enlarging circuit 155, the enlarged image memory 159, the image combining circuit 154, the main image correcting circuit 156, the parameter determining circuit 157, and the main image memory 158, respectively, in the second embodiment.

The input image memory 213 outputs a pixel value corresponding to a coordinate input from the image enlarging circuit 215.

The image combining circuit 214 sequentially outputs all coordinates of the main image memory in the order of raster to the enlarged image correcting circuit 216 and to the main image memory 218 at each rise of the pixel switch signal in the synchronizing signals, in the same manner as in the second embodiment, executes the following calculation for each pixel value obtained as a result of the output of the coordinate from the respective circuits after a fall of the pixel switch signal, and outputs the coordinate value and the value of calculation result to the main image memory 218 before a next rise of the pixel switch signal.

$$M = \alpha \times F_m + (1-\alpha) \times F_i;$$

If $M \geq GM$ then $M = GM$, where $\alpha$ is a constant preliminarily determined as $0 < \alpha < 1$, M is a pixel value output to the main image memory 218, $F_i$ is a pixel value input from the enlarged image correcting circuit 216, and $F_m$ is a pixel value input from the main image memory 218.

However, while the reset signal is in active, the following calculation, that is, a writing process in which only the input from the enlarged image correcting circuit 216 is written in the main image memory 218, is carried out.

$$M = F_i;$$

If $M \geq GM$ then $M = GM$.

The image enlarging circuit 215 executes an enlargement interpolation process of digital image data stored in the input image memory 213 into an image having the same pixel number as the main image memory 218 in the same manner as in the second embodiment and a writing process to write the enlarged image in the enlarged image memory 219 while the frame switch signal is in non-active. The enlarged image memory 219 is an image buffer having the same pixel number as the main image memory, into which an input image enlarged by the image enlarging circuit is written and from which the image is read by the enlarged image correcting circuit 216.

Figure 22:
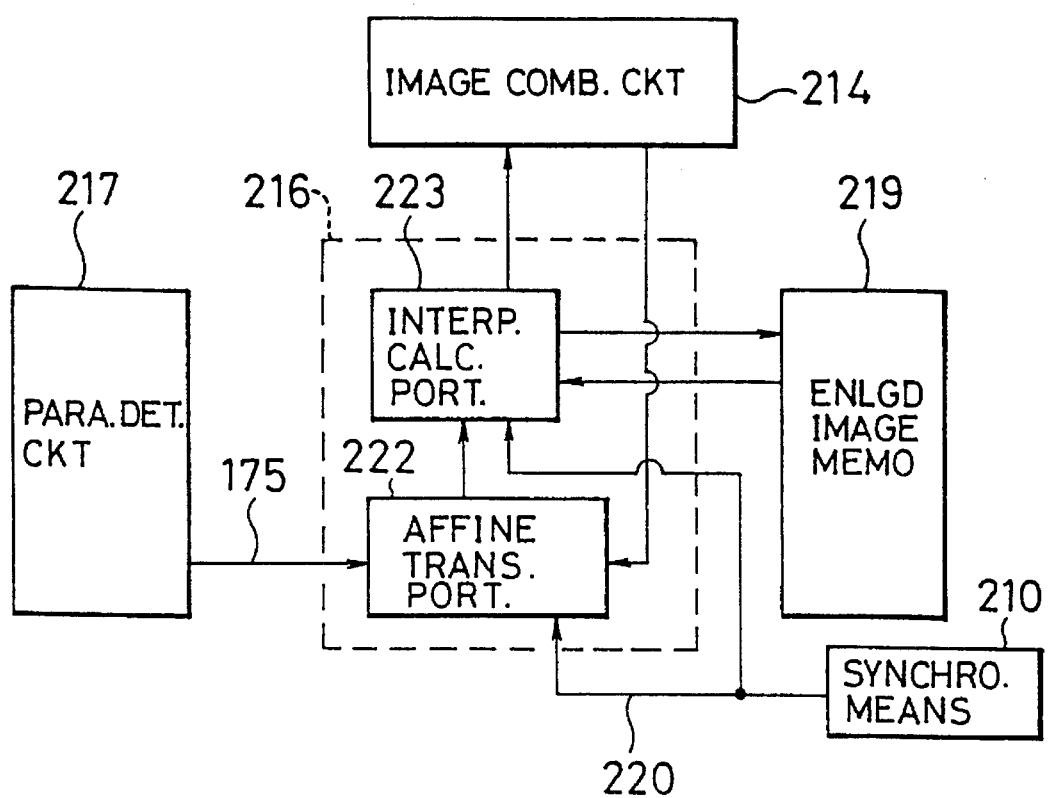
FIG. 22 is a constitutional drawing of an enlarged image correcting circuit in the third embodiment.

The enlarged image correcting circuit 216 is a circuit to execute the affine transformation of the image data in the enlarged image memory 219 with the parameters ($P_a$, $P_b$, $P_c$, $P_d$, $P_e$, $P_f$) input from the parameter determining circuit 217 and then to output pixel data corresponding to a coordinate value input from the image combining circuit 214, to the image combining circuit 214, as shown in FIG. 22, and has the same internal structure and process method as the main image correcting circuit 156 in the second embodiment except for the following respects.

(1) The enlarged image is transformed instead of the main image. Thus, the interpolation calculating portion 223 is connected to the enlarged image memory 219. Since the image of the enlarged image memory can be directly referred to, no image buffer is necessary.

(2) While the reset signal generated from the synchronizing means 210 is in active, the enlarged image correcting circuit 216 executes no transformation process to output a raw pixel value of the enlarged image memory corresponding to the coordinate input from the image combining circuit 214.

Namely, in this period, the affine transformation portion 222 outputs the coordinate value input from the image combining circuit 214 to the interpolation calculating portion 223 as it is.

Further, the interpolation calculating portion 223 executes the following process for the coordinate value input from the affine transformation portion 222.

$$F_k = F_i(x, y),$$

where $F_k$ is a pixel value output to the image combining circuit 214, (x, y) is a coordinate value input from the affine transformation portion 222, and $F_i(x, y)$ is a pixel value of the enlarged image memory corresponding to the coordinate (x, y).

The parameter determining circuit 217 compares the image data pieces respectively stored in the enlarged image memory 219 and in the main image memory 218 with each other to output the correction parameters ($P_a$, $P_b$, $P_c$, $P_d$, $P_e$, $P_f$) to the enlarged image correcting circuit 216 after the frame switch signal starts rising and before the pixel switch signal starts rising.

A difference between the second and the third embodiments is as follows. The representative points are taken on the main image to make matching with the enlarged image in the second embodiment, while the representative points are set on the enlarged image to execute the matching process with the main image.

The main image memory 218 receives a coordinate and a pixel value from the image combining circuit 214 and writes the pixel value in a memory region corresponding to the input coordinate. Also, the main image memory 218 outputs a pixel value corresponding to a coordinate input from the parameter determining circuit 217.

The apparatus having the above arrangement carries out similar processes to those in the second embodiment, so that an image is produced in the main image memory, which is obtained by interpolating and correcting the enlarged image of the first input frame out of frames time-serially input from the image inputting means 11 with image information of frames input after the first frame.

Figure 23:
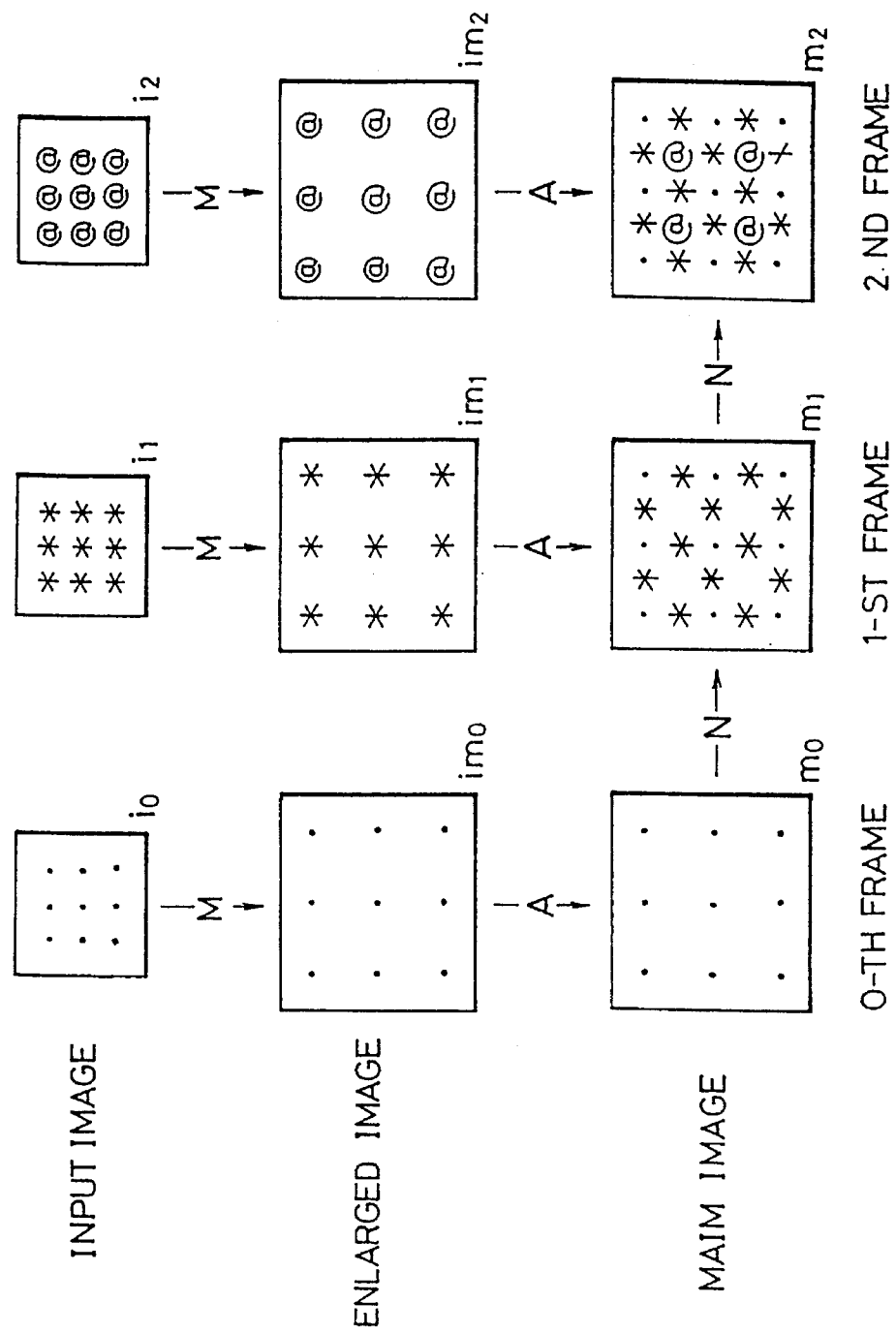
FIG. 23 is a drawing to schematically illustrate a process in the third embodiment.

FIG. 23 schematically shows steps in the processes. In FIG. 23, A, N, and M respectively represent the transformation processes for coordinate, in which A is the affine transformation, N is no transformation, and M is an enlargement process.

Further, i0, i1, and i2 represent sequentially input images, im0, im1, and im2 images obtained by enlarging the input images i0, i1, and i2, and m0, m1, and m2 images produced on the main image memory.

The processing of the 0-th frame is carried out while the reset signal is in active, whereby the image im0 obtained by enlarging the input image i0 is recorded as the image m0 in the main image memory.

In the first frame, the image im1 obtained by enlarging the next input image i1 and the image m0 produced in the 0-th frame are combined to produce the image m1 on the main image memory. In this occasion, the image m0 is not subject to the coordinate transformation but the image im1 is subject to the coordinate transformation by the affine transformation to match the image m0, so that the image m1 is produced by interpolating and correcting the image m0 with the image im0.

In the second frame, the image m2 is produced on the main image memory by interpolating and correcting the image m1 produced in the first frame, with the image im2 obtained by enlarging the next input image i2 in the same manner as the image produced by the process in the first frame.

Fourth Embodiment

In the above second and third embodiments, the transformation parameters are determined in the parameter determining circuit by comparing the images in the main image memory and in the enlarged image memory 159 with each other. However, if an arrangement as shown either in FIG. 24 or in FIG. 25 is employed, the quantity of processing for parameter determination may be reduced. The following describes an image processing apparatus to conduct the contraction matching as the fourth embodiment.

Figure 24:
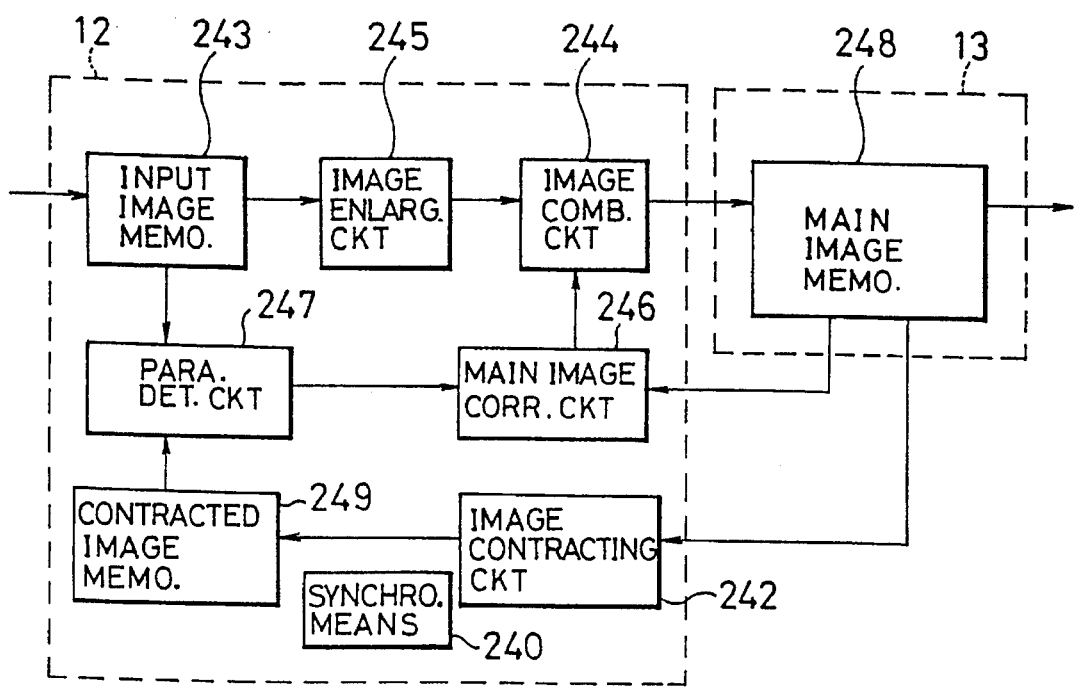
FIG. 24 is a constitutional drawing of the fourth embodiment.
Figure 25:
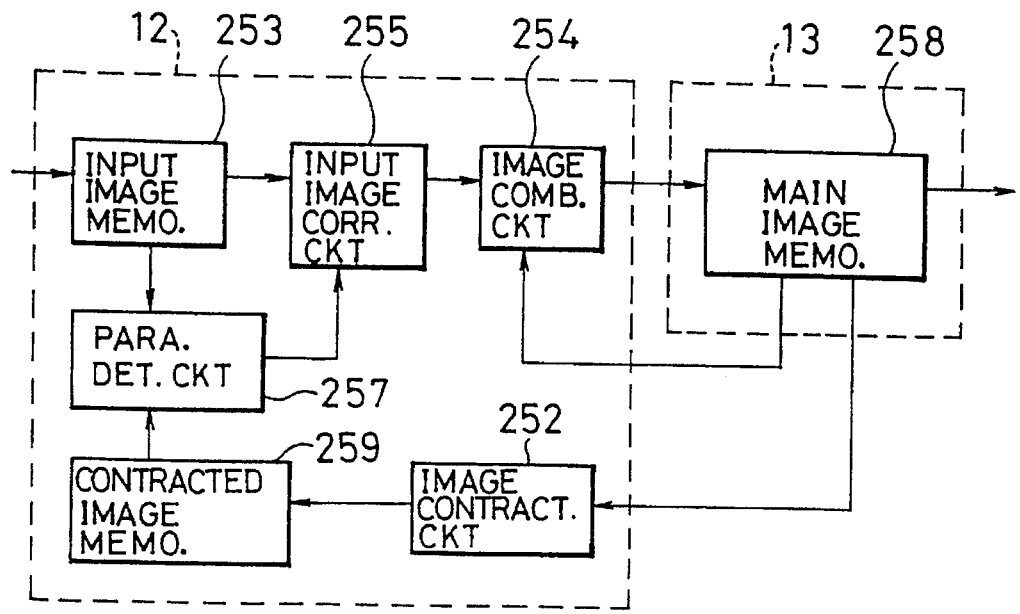
FIG. 25 is a constitutional drawing of the fourth embodiment.

FIG. 24 shows an embodiment obtained by modifying the second embodiment, and FIG. 25 an embodiment obtained by modifying the third embodiment. There is a difference as described below between these embodiments and the second and third embodiments.

The parameter determining circuit compares images in the enlarged image memory and in the main image memory in the second and third embodiments, while the circuit compares an image in the input image memory with an image recorded in a contracted image memory, which is obtained by contracting a main image, in the present embodiments.

For that, there are provided a contracted image memory 249, 259 and an image contracting circuit 242, 252 in each of the present embodiments instead of the enlarged image memory and the image enlarging circuit. Operations of these circuits are described below.

The contracted image memory is first explained. The contracted image memory 249, 259 is an image buffer for storing an image obtained by contracting an image produced in the main image memory into an image having the same pixel number as the image in the input image memory, which is provided with the same number of pixels as the input image memory. The contracted image memory outputs a pixel value corresponding to a coordinate input from the parameter determining circuit 247, 257.

Figure 26:
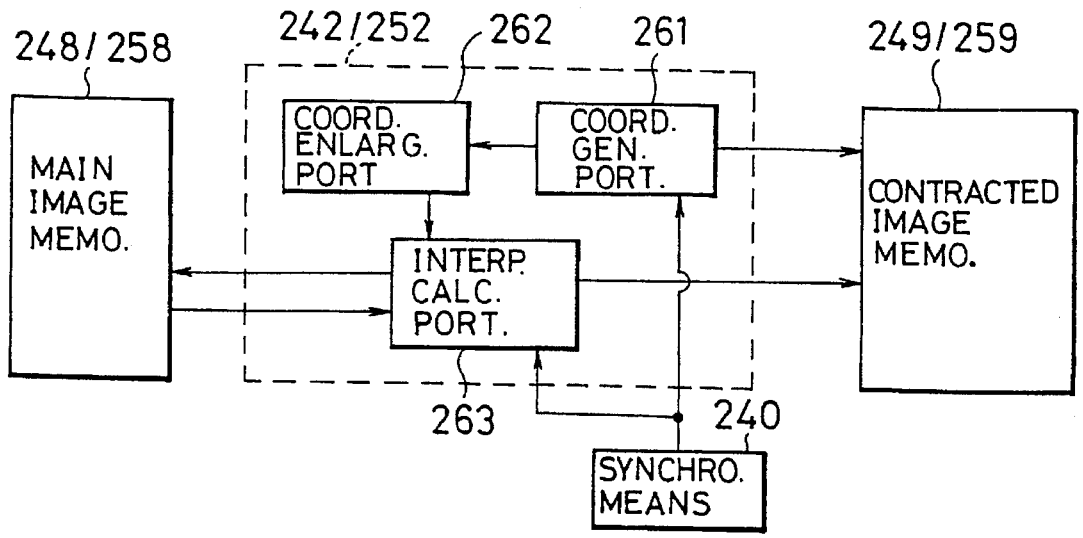
FIG. 26 is a constitutional drawing of an image contracting circuit in the fourth embodiment.

The image contracting circuit is next explained. The image contracting circuit 242, 252 carries out a contraction process, in which image data with (XM, YM) pixels in the main image memory is contracted into image data with (XI, YI) pixels as of the input image memory and which comprises a coordinate generating portion 261, a coordinate enlarging portion 262, and an interpolation calculating portion 263, as shown in FIG. 26.

The coordinate generating portion 261 generates all coordinates of pixels in the contracted image memory in the order of raster in a period between a timing when the frame switch signal from the synchronizing means starts falling and a timing when the frame switch signal again starts rising, to sequentially output the generated coordinates to the coordinate enlarging portion 262 and to output the same coordinate values to the contracted image memory 249, 259.

The coordinate enlarging portion 262 executes the following process for each of the coordinate value input from the coordinate generating portion 261 to output result values to the interpolation calculating portion 263.

(x', y')=(a.x, b.y), where a and b are floating-point type constants to show rates of contraction, which are calculated by the following equations:

$$a = XM/XI;$$

$$b = YM/YI,$$

where x and y are integral coordinate values input from the coordinate generating portion 261, and x' and y' are floating-point type coordinate values output to the interpolation calculating portion 263.

The interpolation calculating portion 263 executes the weighted mean calculation as described below for each of the coordinate values input from the coordinate enlarging portion 262 for example.

$$Mi = \Sigma m \, n\Sigma \, a(m - x', n - y') \cdot I(m, n), \qquad \text{Equation 16}$$

where (m, n) is an integral coordinate value in the proximity of a coordinate value (x', y') input from the coordinate enlarging portion 262, in which m and n are integers as defined in the following ranges:

$$x'-(a/2)<m<x'+(a/2);$$

$$y'-(b/2)<n<y'+(b/2);$$

$M_i$ is a calculation result output to the contracted image memory 249, 259;

a(m–x', n–y') is a weight on a pixel value I(m, n), which is for example a floating-point type numeral with a sum being 1 and being determined by a two-dimensional distance between coordinates (x', y') and (m, n) as defined by the following equations:

$$b(m - x', n - y') = (m - x')^2 + (n - y')^2;$$

$$c = \Sigma m \, n\Sigma \, b(m - x', n - y');$$

$$a(m - x', n - y') = b(m - x', n - y')/c.$$

After the above processes in the image contracting circuit 242, 252, a contracted image, which is an image obtained by contracting an image in the main image memory into one having the same pixel number as the input image memory, is produced in the contracted image memory 249, 259 in a period between a fall and a next rise of the frame switch signal.

The parameter determining circuit is next explained. The parameter determining circuit 247, 257 compares the image data pieces respectively stored in the input image memory and in the contracted image memory in a period between a timing when the frame switch signal starts rising and a timing when the pixel switch signal starts rising, to output the correction parameters ($P_a$, $P_b$, $P_c$, $P_d$, $P_e$, $P_f$) to the main image correcting circuit 246 or to the input image correcting circuit 255.

It is noted that there is a difference in pixel number for matching from that in the second and third embodiments. That is, the processes in the second and third embodiments are carried out for the image with pixels (XM, YM) of the main image memory, while the processes in the present embodiment are carried out for the image with pixels (XI, YI) of the input image memory, whereby the calculation amount may be reduced.

Fifth Embodiment

In the above respective embodiments, the parameters are determined only by the image processing in the parameter determining circuit. It is also possible that, as shown in FIG. 27, the image inputting means 11 is provided with a gyro 271, that movement parameters according to a motion while an operator is moving in panning or the like while holding the image inputting means are supplied to the parameter determining circuit, and that the parameter determining circuit determines the correction parameters from the camera movement amount input from the gyro, whereby reducing the processing data amount for determination of the correction parameters. The following describes an image processing apparatus using the gyro according to the present invention as the fifth embodiment.

FIG. 27 shows an apparatus having the image inputting means 11 of the panorama image producing apparatus in the first embodiment provided with a gyro device. In the present embodiment, the gyro device outputs a parallel displacement velocity $(j_x, j_y)$ of the image inputting means 11 with respect to a CCD image pickup surface, to the parameter determining circuit.

In the parameter determining circuit, the parallel displacement velocity $(j_x, j_y)$ of camera obtained from the gyro device may be reduced into a vector retrieving range $v_x, v_y$, which can be reduced into a quarter of the retrieving range by the following way, in block matching in the vector detecting portion of the parameter determining circuit 27.

$$M_0 = -M, M_1 = M, N_0 = -N, N_1 = N;$$

If $j_x > 0$ then $M_0 = 0$;
If $j_x \leq 0$ then $M_1 = 0$;
If $j_y > 0$ then $N_0 = 0$;
If $j_y \leq 0$ then $N_1 = 0$;

and the retrieving range is defined as follows:

$$M_0 \leq v_x \leq M_1 \text{ and } N_0 \leq v_y \leq N_1.$$

In the above arrangement, the retrieving range is determined by M pixels of $v_x$ and N pixels of $v_y$. Then, the retrieval is performed in the range of the total pixels (2M× 2N) in the method as shown in the first embodiment, while the retrieval only of (N×N) pixels is sufficient in the present embodiment.

The present embodiment shows an example in which the apparatus of the first embodiment is provided with the gyro device. It is also possible that the image inputting means is provided with the gyro device in either of the second, the third, and the fourth embodiments, whereby reducing the processing data amount in the parameter determining circuit.

Sixth Embodiment

Figure 28B:
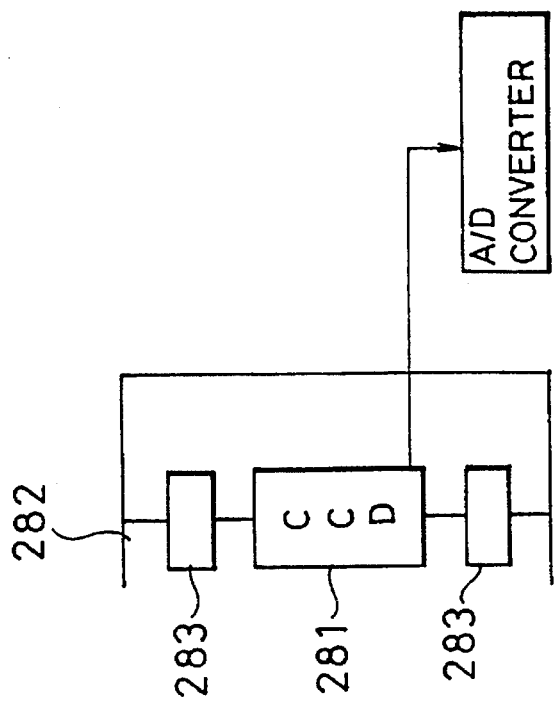
FIG. 28a and 28b are constitutional drawings of image inputting means in the sixth embodiment.
Figure 28A:
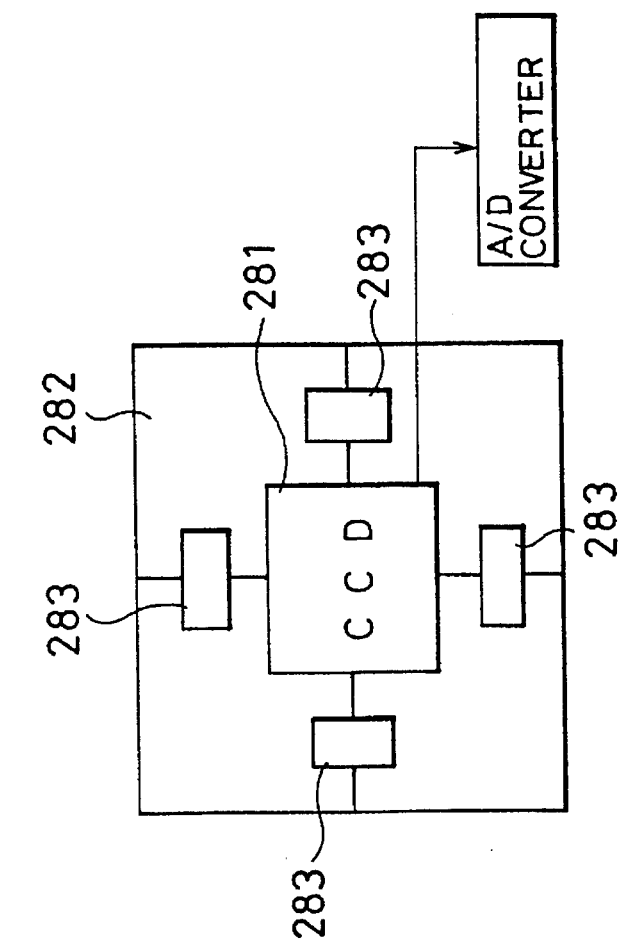

In the above respective embodiments, the input image is changed by camera movement by an operator operating the image inputting means 11. It is also possible that, as shown in FIG. 28a and FIG. 28b, in the condition that an operator fixedly holds the image inputting means a panorama image or a high resolution image is input by moving the image inputting means in an active manner. The following describes such an example as the sixth embodiment. FIG. 28a shows an elevational view of image inputting means in the present embodiment and FIG. 28b shows a sectional side view thereof.

Reference numeral 281 designates a CCD image pickup portion in the image inputting means, which comprises a CCD element and peripheral circuits and which is connected through a signal line to an A/D converting portion. The CCD image pickup surface is a front surface in FIG. 28a and a left surface in FIG. 28b.

Numeral 282 is a housing, which is made of a plastic or a metal. Numeral 283 is a vibrating device for physically connecting between the CCD image pickup portion 281 and the housing 282, which comprises piezo-electric devices or springs.

If the vibrating device comprises piezo-electric devices in the image inputting means in the present embodiment, the piezo-electric devices are always vibrated by an AC voltage from a power source. In this arrangement, while an operator fixedly holds the housing, a plurality of kinds of images are sequentially input into the CCD image pickup portion by vibrations of the piezo-electric devices in the vibration range thereof. When the plural images are sequentially input into the input processing means in the above embodiments, a high resolution image in the vibration range may be produced on the main image memory.

Alternatively, if the vibrating device comprises springs, an operator holds the housing to supply an initial small vibration, whereby images are sequentially input in a period in which the springs are vibrating in the vibration range thereof. When the images are sequentially input into the input processing means in the above embodiments, a high resolution image in the vibration range may be produced on the main image memory.

Seventh Embodiment

If the input processing means in the second embodiment is connected to a high resolution display apparatus as shown in FIG. 29, a dynamic image of low resolution may be changed into a high resolution image. The following describes such an example as the seventh embodiment.

In FIG. 29, the high resolution image display apparatus comprises dynamic image supplying means 291, input processing means 292, image storing means 293 and image displaying means 294.

The dynamic image supplying means 291 outputs a dynamic image, that is, a plurality of images continuous in time, to the input processing means 292 as digital data of the same type as that provided by the image inputting means in the second embodiment, which comprises an apparatus for digitizing a signal of NTSC for each frame for example.

The input processing means 292 and the image storing means 293 are the same as those in the second embodiment. The image displaying means 294 is an apparatus, which can display an image having more pixels than the image supplied by the dynamic image supplying means 291 and which displays an image of the image storing means 293 as it is, for each frame processing of the input processing means 292. The image displaying means comprises for example a high-vision display device.

Using this apparatus, the processes in the second embodiment are effected on the dynamic image input from the dynamic image supplying means 291 to output the processed image to the image displaying means 294, whereby a dynamic image having numerous pixels may be obtained and displayed from the dynamic image having less pixels.

Many widely different embodiments of the present invention may be constructed without departing from the spirit and scope of the present invention. It should be understood that the present invention is not limited to the specific embodiments described in this specification, except as defined in the appended claims.

What is claimed is:

1. An image processing apparatus comprising:

image inputting means for successively inputting images into said image processing apparatus;

input processing means for processing inputting images; and image storing means for storing images outputted from said image processing means; wherein said input processing means includes image comparing means for comparing an image previously stored in said image storing means with an image currently inputted through said image inputting means to obtain a difference between the image previously stored and the image currently inputted;

image correction means for correcting the image previously stored in said storing means and the image currently inputted through said inputting means respectively in different ways based upon the difference obtained by said image comparing means, said image correction means including means for making an affine transformation of the image stored in said image storing means and means for making a parallel displacement of the image input through said image inputting means; and image combining means for combining the corrected images with each other to supply said image storing means with a combined image, said image combining means including means for an addition of both images by a weighted mean.

2. An image processing apparatus according to claim 1, wherein said image comparing means includes means for detecting parameters of the affine transformation and the parallel displacement by comparing the images with each other.

3. An image processing apparatus according to claim 2, wherein said image comparing means includes means for detecting the parameters of the affine transformation and the parallel displacement from motion vectors at a plurality of representative points each having a coordinate value preliminarily set.

4. An image processing apparatus according to claim 3, wherein said image comparing means includes means for determining the coordinate values of the representative points in accordance with statistical values of pixel data in the input image.

5. An image processing apparatus according to claim 2, wherein said image comparing means includes means for comparing the images after contracting said images to be compared.

6. An image processing apparatus according to claim 1, wherein said image inputting means has a gyro system.

7. An image processing apparatus according to claim 1, wherein said image inputting means has a vibrator.

* * * * *